US012743041B2

(12) United States Patent
Yoshida et al.

(10) Patent No.: US 12,743,041 B2
(45) Date of Patent: Sep. 22, 2026

(54) IMAGE-FORMING APPARATUS GENERATING ELECTRICAL DISCHARGE UPSTREAM OF TRANSFER PORTION

(71) Applicant: CANON KABUSHIKI KAISHA, Tokyo (JP)

(72) Inventors: Tsuguhiro Yoshida, Kanagawa (JP); Shuichi Tetsuno, Kanagawa (JP); Koji An, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,945

(22) Filed: Jan. 24, 2023

(65) Prior Publication Data

US 2023/0236530 A1 Jul. 27, 2023

(30) Foreign Application Priority Data

Jan. 26, 2022 (JP) ................................ 2022-009849

(51) Int. Cl.
*G03G 15/16* (2006.01)
*G03G 15/00* (2006.01)
(Continued)

(52) U.S. Cl.
CPC ..... *G03G 15/1675* (2013.01); *G03G 15/0216* (2013.01); *G03G 15/065* (2013.01);
(Continued)

(58) Field of Classification Search
CPC ...................... G03G 15/0806; G03G 15/0848
See application file for complete search history.

(56) References Cited

U.S. PATENT DOCUMENTS 6,278,858 B1 * 8/2001 Nakazawa ........... G03G 15/161 399/302
8,913,916 B2 * 12/2014 Kawamata ......... G03G 21/0064 399/119

(Continued)

FOREIGN PATENT DOCUMENTS

CN 1374565 A 10/2002
CN 103140808 A 6/2013

(Continued)

OTHER PUBLICATIONS

Translation of JP-3671537-B2.*
Translation of JP-2012098710.*
English translation of Description JP2001281912A.*

*Primary Examiner* — Arlene Heredia Ocasio
(74) *Attorney, Agent, or Firm* — Canon U.S.A., Inc. IP Division

(57) ABSTRACT

An image-forming apparatus includes a rotatable developer-bearing member to bear a developer including a toner particle and a transfer promoting particle attached to the toner particle. When F denotes pressing force for pressing the developer-bearing member against an image-bearing member, and N denotes a number of the transfer promoting particles interposed between the toner particle and the image-bearing member, adhesion strength Ft between the transfer promoting particle and the toner particle measured by pressing the transfer promoting particle against the toner particle at a pressing force per unit transfer promoting particle F/N and adhesion strength Fdr between the transfer promoting particle and the image-bearing member measured by pressing the transfer promoting particle against the image-bearing member at the pressing force per unit transfer promoting particle F/N, satisfy Ft<Fdr, and electrical discharge is generated upstream of a transfer portion in a movement direction of an intermediate transfer belt.

19 Claims, 17 Drawing Sheets

(51) Int. Cl.

| | |
|---|---|
| ***G03G 15/02*** | (2006.01) |
| ***G03G 15/06*** | (2006.01) |
| ***G03G 15/08*** | (2006.01) |
| ***G03G 21/00*** | (2006.01) |

(52) U.S. Cl.

CPC ........... *G03G 15/08* (2013.01); *G03G 15/161* (2013.01); *G03G 15/162* (2013.01); *G03G 15/163* (2013.01); *G03G 15/5004* (2013.01); *G03G 21/0064* (2013.01); *G03G 15/0848* (2013.01); *G03G 2215/022* (2013.01)

(56) References Cited

U.S. PATENT DOCUMENTS

| | | | | |
|---|---|---|---|---|
| 2002/0064720 | A1* | 5/2002 | Tsutsumi | G03G 5/14773 348/333.05 |
| 2008/0166158 | A1 | 7/2008 | Takahashi et al. | |
| 2009/0103953 | A1 | 4/2009 | Tokutake | |
| 2018/0253036 | A1* | 9/2018 | Yokoyama | G03G 15/5008 |
| 2019/0113881 | A1* | 4/2019 | Tetsuno | G03G 15/1675 |
| 2020/0026208 | A1* | 1/2020 | Terui | G03G 9/08755 |
| 2020/0209768 | A1* | 7/2020 | Furui | G03G 9/09733 |
| 2021/0026264 | A1* | 1/2021 | Kamikura | G03G 9/0825 |
| 2021/0302901 | A1* | 9/2021 | Ishio et al. | G03G 21/0017 |
| 2022/0035274 | A1* | 2/2022 | Tetsuno | G03G 21/0005 |
| 2023/0236526 | A1* | 7/2023 | Mitani | G03G 15/0189 399/53 |
| 2025/0258448 | A1 | 8/2025 | Tokumura | |

FOREIGN PATENT DOCUMENTS

| | | | | | |
|---|---|---|---|---|---|
| CN | 107664940 | A | | 2/2018 | |
| CN | 111381465 | A | | 7/2020 | |
| CN | 111796495 | A | | 10/2020 | |
| JP | H1063027 | A | | 3/1998 | |
| JP | H10307485 | A | | 11/1998 | |
| JP | 2001281912 | A | | 10/2001 | |
| JP | 2002006643 | A | | 1/2002 | |
| JP | 2002099156 | A | | 4/2002 | |
| JP | 2002162767 | A | | 6/2002 | |
| JP | 2004251923 | A | * | 9/2004 | |
| JP | 3671537 | B2 | * | 7/2005 | |
| JP | 2005181569 | A | | 7/2005 | |
| JP | 2005274643 | A | | 10/2005 | |
| JP | 2006276060 | A | * | 10/2006 | |
| JP | 2006276062 | A | * | 10/2006 | |
| JP | 2008129339 | A | | 6/2008 | |
| JP | 2012098710 | A | * | 5/2012 | G03G 15/1605 |
| JP | 2012203368 | A | * | 10/2012 | G03G 9/0812 |
| JP | 2013217988 | A | | 10/2013 | |
| JP | 2014122994 | A | | 7/2014 | |
| JP | 2018036624 | A | | 3/2018 | |
| JP | 2020012943 | A | | 1/2020 | |
| JP | 2021162610 | A | | 10/2021 | |
| KR | 20080065894 | A | | 7/2008 | |

* cited by examiner

FIG. 15

| | COVERAGE WITH TRANSFER CARRIER PARTICLES (%) |
|---|---|
| EXEMPLARY EMBODIMENT | 61.7 |
| COMPARATIVE EXAMPLE 1 | 5.0 |

FIG. 16

| | ADHESION STRENGTH BETWEEN TRANSFER CARRIER PARTICLE AND TONER (nN) | ADHESION STRENGTH BETWEEN TRANSFER CARRIER PARTICLE AND PHOTOSENSITIVE DRUM (nN) |
|---|---|---|
| EXEMPLARY EMBODIMENT 1 | 32.8 | 210.1 |
| COMPARATIVE EXAMPLE 1 | 304.6 | 210.1 |

IMAGE-FORMING APPARATUS GENERATING ELECTRICAL DISCHARGE UPSTREAM OF TRANSFER PORTION

BACKGROUND OF THE INVENTION

Field of the Invention

The present disclosure relates to an image-forming apparatus utilizing an electrophotographic process or the like.

Description of the Related Art

Image-forming apparatuses that form images using an electrophotographic process, such as copying machines or laser printers, have been known.

In such image-forming apparatuses, in a transferring step, a voltage is applied from a voltage power supply to a transfer member located at a portion facing a photosensitive drum serving as an image-bearing member to electrostatically transfer a toner image formed on the surface of the photosensitive drum onto an intermediate transfer member or a recording material. To form a multicolor toner image, this transferring step is repeatedly performed for the multicolor toner image to form the multicolor toner image on a surface of an intermediate transfer member or a recording material. A developer (toner) that has not been transferred from a photosensitive drum to an intermediate transfer member or to a recording material is removed from the photosensitive drum by a cleaning member and is stored as waste toner in a waste toner storage portion in a cleaning unit.

In recent years, however, a cleanerless system without a system for cleaning the surface of a photosensitive drum has been proposed to decrease the size of the apparatus. To provide a cleanerless system, the transfer efficiency of a toner image from a photosensitive drum to an intermediate transfer member can be improved, and the amount of untransferred toner on the surface of the photosensitive drum can be decreased after the toner image is transferred by a transfer member.

It is proposed in Japanese Patent Laid-Open No. 10-63027 that, to provide a cleanerless system in particular, fine particles are attached to the surface of a photosensitive drum in advance and are interposed between the photosensitive drum and a toner image to reduce the adhesion strength between the photosensitive drum and toner and thereby improve transfer efficiency.

It is also proposed in Japanese Patent Laid-Open No. 10-63027 that fine particles are supplied from a developing apparatus onto a photosensitive drum by using toner to which the fine particles are externally added as a means for attaching the fine particles to the surface of the photosensitive drum.

However, such a structure that has increased primary transfer efficiency to decrease the amount of toner remaining on a photosensitive drum as disclosed in Japanese Patent Laid-Open No. 10-63027 has the following problems.

In a high temperature and high humidity environment or after durability degradation in which the charge amount of toner tends to decrease, a structure disclosed in Japanese Patent Laid-Open No. 10-63027 may have lower transfer efficiency. In such a state, a high transfer voltage to increase transfer efficiency increases electrostatic force acting in the direction of transferring toner from a photosensitive drum to an intermediate transfer member and thereby improves transfer efficiency. However, when toner already formed on an intermediate transfer member passes through a transfer portion where a photosensitive drum comes into contact with the intermediate transfer member, an image defect sometimes occurs due to an increase in retransfer in which the toner is reverse-transferred to the photosensitive drum.

SUMMARY OF THE INVENTION

The present disclosure improves transfer efficiency and reduces retransfer by effectively supplying fine particles to the surface of a photosensitive drum.

An image-forming apparatus according to the present disclosure includes:

a rotatable image-bearing member;

a rotatable developer-bearing member configured to bear a developer composed of a toner particle and a transfer promoting particle attached to a surface of the toner particle, configured to come into contact with the image-bearing member and form a developing portion, and configured to supply the developer to a surface of the image-bearing member in the developing portion;

an intermediate transfer belt configured to come into contact with the image-bearing member and form a transfer portion;

a current supply unit configured to apply a transfer voltage to the intermediate transfer belt to supply a transfer current from the intermediate transfer belt to the image-bearing member in the transfer portion; and a control unit configured to control the current supply unit, wherein the transfer promoting particle borne on a surface of the developer-bearing member can be supplied to the surface of the image-bearing member in the developing portion while the image-bearing member rotates, when F denotes pressing force for pressing the developer-bearing member against the image-bearing member, and N denotes a total number of the transfer promoting particles interposed between the toner particle and the image-bearing member, adhesion strength Ft formed between the transfer promoting particle and the toner particle measured by pressing the transfer promoting particle against the toner particle at a pressing force per unit transfer promoting particle F/N and adhesion strength Fdr formed between the transfer promoting particle and the image-bearing member measured by pressing the transfer promoting particle against the image-bearing member at the pressing force per unit transfer promoting particle F/N, satisfy $Ft<Fdr$, and the control unit generates an electrical discharge between the image-bearing member and the intermediate transfer belt in a movement direction of a surface of the intermediate transfer belt upstream of an upstream end portion of the transfer portion and controls a potential difference between the image-bearing member and the intermediate transfer belt in the transfer portion to be lower than a Paschen discharge threshold.

An image-forming apparatus according to the present disclosure includes a rotatable image-bearing member;

a charging member configured to charge a surface of the image-bearing member in a charging portion facing the image-bearing member;

a rotatable developer-bearing member configured to bear a developer composed of a toner particle and a transfer promoting particle attached to a surface of the toner particle, configured to come into contact with the image-bearing member and form a developing portion, and configured to supply the developer to the surface of the image-bearing member in the developing portion;

an intermediate transfer belt configured to come into contact with the image-bearing member and form a transfer portion;

a charging voltage application unit configured to apply a charging voltage to the charging member;

a current supply unit configured to apply a transfer voltage to the intermediate transfer belt to supply a transfer current from the intermediate transfer belt to the image-bearing member in the transfer portion; and a control unit configured to control the charging voltage application unit and the current supply unit, wherein the transfer promoting particle borne on a surface of the developer-bearing member can be supplied to the surface of the image-bearing member in the developing portion while the image-bearing member rotates, when F denotes pressing force for pressing the developer-bearing member against the image-bearing member, and N denotes a total number of the transfer promoting particles interposed between the toner particle and the image-bearing member, adhesion strength Ft formed between the transfer promoting particle and the toner particle measured by pressing the transfer promoting particle against the toner particle at a pressing force per unit transfer promoting particle F/N and adhesion strength Fdr formed between the transfer promoting particle and the image-bearing member measured by pressing the transfer promoting particle against the image-bearing member at the pressing force per unit transfer promoting particle F/N, satisfy Ft<Fdr, and when a potential difference between a first potential formed on the surface of the image-bearing member and the charging voltage in the charging portion is defined as a first potential difference, and a potential difference between a second potential formed on the surface of the image-bearing member and a surface potential of the intermediate transfer belt in the transfer portion is defined as a second potential difference, the control unit performs control so that the second potential difference is smaller than the first potential difference while the image-bearing member rotates and the charging voltage is applied.

An image-forming apparatus according to the present disclosure includes:

a rotatable image-bearing member;

a charging member configured to charge a surface of the image-bearing member in a charging portion facing the image-bearing member;

a rotatable developer-bearing member configured to bear a developer composed of a toner particle and a transfer promoting particle attached to a surface of the toner particle, configured to come into contact with the image-bearing member and form a developing portion, and configured to supply the developer to the surface of the image-bearing member in the developing portion;

an intermediate transfer belt configured to come into contact with the image-bearing member and form a transfer portion;

a charging voltage application unit configured to apply a charging voltage to the charging member;

a current supply unit configured to apply a transfer voltage to the intermediate transfer belt to supply a transfer current from the intermediate transfer belt to the image-bearing member in the transfer portion; and a control unit configured to control the charging voltage application unit and the current supply unit, wherein the transfer promoting particle borne on a surface of the developer-bearing member can be supplied to the surface of the image-bearing member in the developing portion while the image-bearing member rotates, when F denotes pressing force for pressing the developer-bearing member against the image-bearing member, and N denotes a total number of the transfer promoting particles interposed between the toner particle and the image-bearing member, adhesion strength Ft formed between the transfer promoting particle and the toner particle measured by pressing the transfer promoting particle against the toner particle at a pressing force per unit transfer promoting particle F/N and adhesion strength Fdr formed between the transfer promoting particle and the image-bearing member measured by pressing the transfer promoting particle against the image-bearing member at the pressing force per unit transfer promoting particle F/N, satisfy Ft<Fdr, and when a potential difference between a first potential formed on the surface of the image-bearing member and the charging voltage in the charging portion is defined as a first potential difference, and a potential difference between a second potential formed on the surface of the image-bearing member and the transfer voltage in the transfer portion is defined as a second potential difference, the control unit performs control so that the second potential difference is smaller than the first potential difference while the image-bearing member rotates and the charging voltage is applied.

An image-forming apparatus according to the present disclosure includes:

a rotatable image-bearing member;

a rotatable developer-bearing member configured to bear a developer composed of a toner particle and a transfer promoting particle attached to a surface of the toner particle, configured to come into contact with the image-bearing member and form a developing portion, and configured to supply the developer to a surface of the image-bearing member in the developing portion;

an intermediate transfer belt configured to come into contact with the image-bearing member and form a transfer portion;

a current supply unit configured to apply a transfer voltage to the intermediate transfer belt to supply a transfer current from the intermediate transfer belt to the image-bearing member in the transfer portion;

a current supply member configured to come into contact with the intermediate transfer belt and supply an electric current to the intermediate transfer belt; and a control unit configured to control the current supply unit, wherein the transfer promoting particle borne on a surface of the developer-bearing member can be supplied to the surface of the image-bearing member in the developing portion while the image-bearing member rotates, when F denotes pressing force for pressing the developer-bearing member against the image-bearing member, and N denotes a total number of the transfer promoting particles interposed between the toner particle and the image-bearing member, adhesion strength Ft formed between the transfer promoting particle and the toner particle measured by pressing the transfer promoting particle against the toner particle at a pressing force per unit transfer promoting particle F/N and adhesion strength Fdr formed between the transfer promoting particle and the image-bearing member measured by pressing the transfer promoting particle against the image-bearing member at the pressing force per unit transfer promoting particle F/N, satisfy Ft<Fdr, the intermediate transfer belt includes, in a thickness direction of the intermediate transfer belt, a first layer with electroconductivity among a plurality of layers constituting the intermediate transfer belt and a second layer with electroconductivity and with a lower electrical resistance than the first layer, and a toner image is transferred from the image-bearing member to the intermediate transfer belt by applying a voltage from the current supply unit to the current supply member.

Further features of the present invention will become apparent from the following description of embodiments with reference to the attached drawings.

BRIEF DESCRIPTION OF THE DRAWINGS

FIG. 15 is a table showing the results of examining the coverage with transfer promoting particles in Embodiment 1.

FIG. 16 is a table showing the results of adhesion strength measurement in Embodiment 1.

DESCRIPTION OF THE EMBODIMENTS

Preferred embodiments of the present disclosure are described in detail below by way of example with reference to the accompanying drawings. However, the dimensions, materials, shapes, relative arrangements, and the like of components described in these embodiments should be appropriately changed depending on the structures and various conditions of apparatuses to which the present disclosure is applied. Thus, unless otherwise specified, the scope of the present disclosure is not limited to them. Each of the embodiments of the present invention described below can be implemented solely or as a combination of a plurality of the embodiments or features thereof where necessary or where the combination of elements or features from individual embodiments in a single embodiment is beneficial.

1. Image-Forming Apparatus

The present disclosure relates particularly to an image-forming apparatus of a drum cleanerless system without a device for cleaning an image-bearing member.

Figure 1:
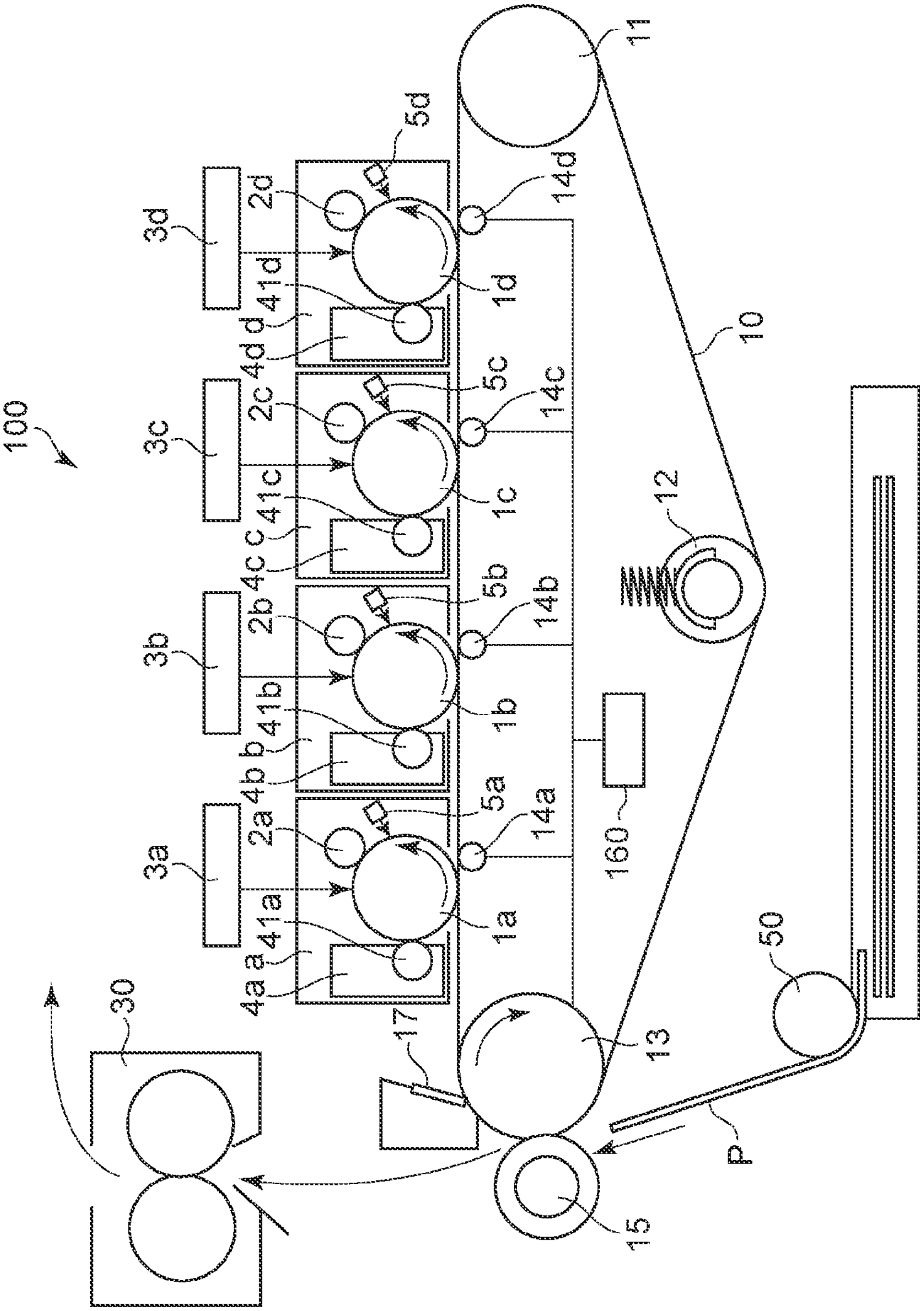
FIG. 1 is a schematic view of an image-forming apparatus according to Embodiment 1.

FIG. 1 is a schematic view of an example of a color-image-forming apparatus. The structure and operation of the image-forming apparatus according to the present embodiment are described with reference to FIG. 1. The image-forming apparatus according to the present embodiment is a tandem printer including image-forming stations a to d. A first image-forming station a forms a yellow (Y) image, a second image-forming station b forms a magenta (M) image, a third image-forming station c forms a cyan (C) image, and a fourth image-forming station d forms a black (Bk) image. The structures of the image-forming stations are the same except for the color of toner contained therein, and the first image-forming station a is described below. When no particular distinction is required, Y, M, C, and K are collectively described without a to d.

The first image-forming station a includes a drum-shaped electrophotographic photosensitive member (hereinafter referred to as a photosensitive drum) 1*a*, a charging roller 2*a* as a charging device, an exposure unit 3*a*, and a development unit 4*a*.

The photosensitive drum 1*a* is an image-bearing member that is driven to rotate by a photosensitive drum drive unit 110 at a circumferential velocity (process speed) of 150 mm/s in the direction of the arrow and that bears a toner image. The photosensitive drum 1*a* includes a photosensitive layer if and a surface layer 1*e* (see FIG. 12) on an aluminum pipe with a diameter ϕ of 20 mm. The surface layer 1*e* is a thin polyarylate layer with a thickness of 20 μm.

When a control unit 200, such as a controller, receives an image signal, an image-forming operation is started, and the photosensitive drum 1*a* is driven to rotate. In the rotation process, the photosensitive drum 1*a* is uniformly charged to a predetermined potential with a predetermined polarity (the normal polarity is negative polarity in the present embodiment) by the charging roller 2*a* and is exposed to light emitted from the exposure unit 3*a* in accordance with the image signal. This forms an electrostatic latent image corresponding to a yellow component image of a target color image. The electrostatic latent image is then developed by the development unit (yellow development unit) 4*a* at a development position and is visualized as a yellow toner image.

The charging roller 2*a* serving as a charging member is in contact with the surface of the photosensitive drum 1*a* in a charging portion at a predetermined pressure contact force and is driven to rotate with the photosensitive drum 1*a* by friction with the surface of the photosensitive drum 1*a*. A predetermined direct-current voltage is applied to the rotating shaft of the charging roller 2*a* from a charging voltage power supply 120 in the image-forming operation. In the present embodiment, the charging roller 2*a* includes an elastic layer formed of a conductive elastomer with a thickness of 1.5 mm and a volume resistivity of approximately $1\times10^6$ Ωcm on a metal shaft with a diameter ϕ of 5.5 mm. In the image-forming operation, the control unit 200 applies a direct-current voltage of −1050 V as a charging voltage to the rotating shaft of the charging roller 2*a* to charge the surface of the photosensitive drum 1*a* to a predetermined potential of −500 V. The surface potential of the photosensitive drum 1*a* was measured with a surface electrometer Model 344 manufactured by Trek Inc. The surface potential −500 V of the photosensitive drum 1*a* is the surface potential of the photosensitive drum 1*a* in a non-image-forming period, which is the dark potential (Vd) at which the toner image is not developed. The surface layer of the charging roller 2*a* has a large number of protrusions with an average height of approximately 10 μm. The protrusions on the surface layer of the charging roller 2*a* act as spacers between the charging roller 2*a* and the photosensitive drum 1*a* in the charging portion. When residual toner not transferred and remaining on the photosensitive drum 1*a*, that is, untransferred toner in a primary transfer portion described later enters the charging portion, a portion other than the protrusions comes into contact with the untransferred toner and prevents or suppresses the charging roller 2*a* from being contaminated with the untransferred toner.

Figure 2:
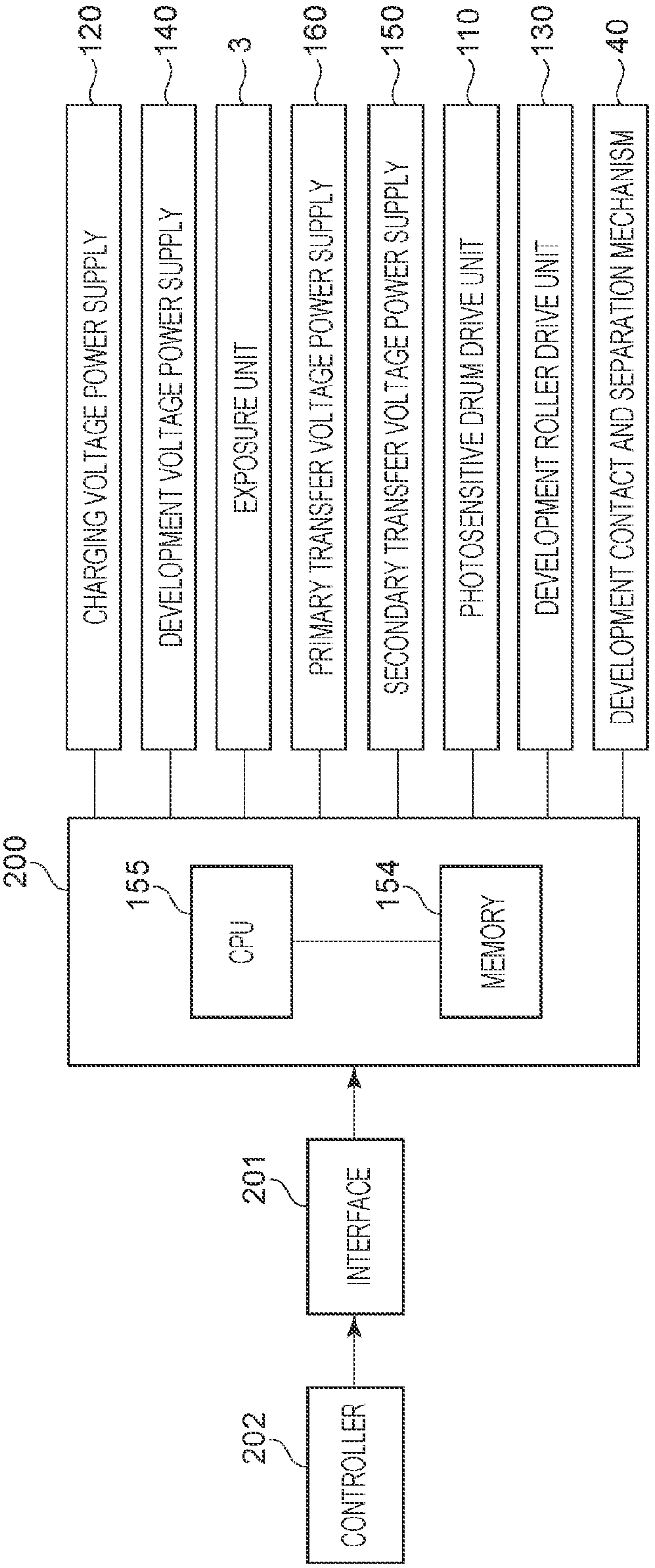
FIG. 2 is a control block diagram in Embodiment 1.

The exposure unit 3*a* includes a laser driver, a laser diode, a polygon mirror, and an optical lens system. As illustrated in FIG. 2, an exposure unit 3 receives a time-series electric digital pixel signal of image information that is input from a controller 202 to the control unit 200 via an interface 201 and is subjected to image processing. In the present embodiment, the exposure level is adjusted so that the image-forming potential V1 of a photosensitive drum 1 in an electrostatic latent image portion exposed by the exposure unit 3*a* is −100 V. The image-forming potential is also referred to as a bright potential.

The development unit 4*a* includes a development roller 41*a* as a developing member (developer-bearing member) and a nonmagnetic one-component developer composed of toner and transfer promoting particles (transfer carrier particles) described later. The development unit 4*a* is a development device for performing a development operation on the photosensitive drum 1 to develop the electrostatic latent image as a toner image and is a developer storage portion for storing a developer. As illustrated in FIG. 2, an image-forming apparatus main body 100 includes a contact and separation mechanism 40 for controlling the contact and separation (development separation) state between the development roller 41*a* and the photosensitive drum 1*a*. The control unit 200 performs contact and separation between the development roller 41*a* and the photosensitive drum 1*a* in accordance with the image-forming operation or another operation. When the development roller 41*a* is in contact with the photosensitive drum 1*a*, the pressing force of the development roller 41*a* is 1.96 N. A development nip portion, which is a contact portion between the development roller 41*a* and the photosensitive drum 1*a*, has a width of 2 mm in the rotational direction of the photosensitive drum 1*a* and a width of 220 mm in the longitudinal direction of the photosensitive drum. The development roller 41*a* is driven to rotate by a development roller drive unit 130 at a higher circumferential velocity than the photosensitive drum 1*a* such that the surface movement direction of the development roller 41*a* is in the forward direction with the surface movement direction of the photosensitive drum 1*a* at the portion (contact portion) facing the photosensitive drum 1*a*. In the present embodiment, the development roller 41*a* is driven to rotate at a circumferential velocity of 140% of the circumferential velocity of the photosensitive drum 1*a*.

A pre-exposure unit 5*a* serving as a charge eliminating unit eliminates electricity by exposing the surface of the photosensitive drum 1*a* before the surface of the photosensitive drum 1*a* is charged by the charging roller 2*a*. The removal of electricity from the surface of the photosensitive drum 1*a* smooths the surface potential formed on the photosensitive drum 1 and controls the amount of electrical discharge caused by electrical discharge in the charging portion.

When the development roller 41*a* is in contact with the photosensitive drum 1*a* in the image-forming operation, the control unit 200 controls a development voltage power supply 140 to apply a direct-current voltage of −300 V as a development voltage Vdc to the metal core of the development roller 41*a*. In the image-forming period, toner borne on the development roller 41*a* is developed in an image-forming potential V1 portion of the photosensitive drum 1*a* by an electrostatic force generated by a potential difference between the development voltage Vdc=−300 V and the image-forming potential V1=−100 V of the photosensitive drum 1*a*.

In the following description, with respect to potential and applied voltage, a large absolute value on the negative polarity side (for example, −1000 V with respect to −500 V) is referred to as a high potential, and a small absolute value on the negative polarity side (for example, −300 V with respect to −500 V) is referred to as a low potential. This is because toner with negative chargeability in the present embodiment is considered as a reference.

The voltage in the present embodiment is expressed as a potential difference from the ground potential (0 V). Thus, the development voltage Vdc=−300 V is interpreted as a potential difference of −300 V from the ground potential due to the development voltage applied to the metal core of the development roller 41*a*. This also applies to the charging voltage, the transfer voltage, and the like.

The control unit 200 is described below. FIG. 2 is a control block diagram showing a schematic control mode of a principal part of the image-forming apparatus 100 in the present embodiment. The controller 202 exchanges various electrical information with a host apparatus and controls the image-forming operation of the image-forming apparatus 100 in an integrated manner in the control unit 200 through the interface 201 in accordance with a predetermined control program or reference table. The control unit 200 includes a CPU 155 as a central element for performing various arithmetic processing and a memory 154, such as a memory element ROM or RAM. The RAM stores a detection result of a sensor, a count result of a counter, and a calculation result. The ROM stores a control program and a data table obtained in advance by an experiment or the like. The control unit 200 is coupled to a control object, sensor, counter, and the like in the image-forming apparatus 100. The control unit 200 exchanges various electrical information signals and controls the timing of driving each unit to control a predetermined image-forming sequence. For example, the control unit 200 controls the exposure level and the voltages applied by the charging voltage power supply 120 serving as a charging voltage application unit, the development voltage power supply 140 serving as a development voltage application unit, the exposure unit 3, and a primary transfer voltage power supply 160 and a secondary transfer voltage power supply 150 serving as current supply units. The control unit 200 also controls the photosensitive drum drive unit 110, the development roller drive unit 130, and the development contact and separation mechanism 40. The image-forming apparatus 100 forms an image on a recording material P on the basis of an electrical image signal input from a host apparatus to the controller 202. The host apparatus may be an image reader, a personal computer, a facsimile, or a smartphone.

The toner in the present embodiment is a nonmagnetic toner with negative chargeability produced by a suspension polymerization method, has a volume-average particle diameter of 7.0 μm, and is negatively charged when borne on the development roller 41*a*. The volume-average particle diameter of toner was measured with a laser diffraction particle size distribution measuring instrument LS-230 manufactured by Beckman Coulter, Inc. Toner is described in detail later.

An intermediate transfer belt 10 serving as an intermediate transfer member is stretched by a plurality of stretching members 11, 12, and 13. The stretching member 13 is driven to rotate by a motor (not shown) such that the surface of the intermediate transfer belt 10 is rotationally moved at a circumferential velocity of 103% of the circumferential velocity of the surface of the photosensitive drum 1*a* in the circumferential direction at a portion at which the intermediate transfer belt 10 faces the photosensitive drum 1*a*. The stretching members 11 and 12 are driven to rotate by the pivot of the intermediate transfer belt 10. A direct-current voltage of 250 V is applied from the primary transfer voltage power supply 160 to a primary transfer roller 14*a* serving as a primary transfer member at the time of primary transfer in the image-forming operation. In the present embodiment, a direct-current voltage is also applied to the stretching member 13 from the primary transfer voltage power supply 160. A direct-current voltage may be applied from the primary transfer voltage power supply 160 to the stretching members 11 and 12 or may not be applied to the stretching member 13. The yellow toner image formed on the photosensitive drum 1*a* is electrostatically transferred onto the intermediate transfer belt 10 while passing through a primary transfer portion, which is a contact portion between the photosensitive drum 1*a* and the primary transfer roller 14*a* with the intermediate transfer belt 10 interposed therebetween. In the present embodiment, the photosensitive drum 1 and the intermediate transfer belt 10 have a difference in circumferential velocity. This moves toner on the photosensitive drum 1 in the primary transfer portion, reduces adhesion strength, and thereby improves primary transfer efficiency. The developer not transferred to the intermediate transfer belt 10 and remaining on the photosensitive drum 1 is collected by a development roller 41.

The primary transfer roller 14*a* is a 6-mmϕ cylindrical metal roller and is made of nickel-plated steel. The primary transfer roller 14*a* is offset 8 mm downstream of the center position of the photosensitive drum 1*a* in the movement direction of the intermediate transfer belt 10, and the intermediate transfer belt 10 is wound around the photosensitive drum 1*a*. The plurality of photosensitive drums 1 and the plurality of primary transfer rollers 14 are arranged such that the distance from the shaft center of each photosensitive drum 1 to the shaft center of the corresponding primary transfer roller 14 is the same. The offset may be changed in each image-forming station. The primary transfer roller 14*a* is located at a position higher by 1 mm than the horizontal plane formed by the photosensitive drum 1*a* and the intermediate transfer belt 10 to ensure the amount of winding of the intermediate transfer belt 10 around the photosensitive drum 1*a*. The primary transfer roller 14*a* presses the intermediate transfer belt 10 at a force of approximately 1.96 N. The primary transfer roller 14*a* is driven to rotate by the rotation of the intermediate transfer belt 10. The primary transfer roller 14*b* in the second image-forming station b, the primary transfer roller 14*c* in the third image-forming station c, and the primary transfer roller 14*d* in the fourth image-forming station d have the same structure as the primary transfer roller 14*a*.

A magenta toner image of a second color, a cyan toner image of a third color, and a black toner image of a fourth color are formed in the same manner in the second, third, and fourth image-forming stations b, c, and d and are sequentially transferred and superimposed on the intermediate transfer belt 10. Thus, a composite color image corresponding to the target color image is formed.

The four color toner images on the intermediate transfer belt 10 are collectively transferred to the surface of the recording material P fed by a sheet feeding unit 50 in a secondary transferring step in which the toner images pass through a secondary transfer nip portion formed by the intermediate transfer belt 10 and a secondary transfer roller 15 serving as a secondary transfer member. The secondary transfer roller 15 is in contact with the intermediate transfer belt 10 at a pressure of 50 N and forms the secondary transfer nip portion. When the secondary transfer roller 15 is driven to rotate by the intermediate transfer belt 10 and the toner on the intermediate transfer belt 10 is secondarily transferred to the recording material P, such as a paper sheet, a voltage of 1500 V is applied by the secondary transfer voltage power supply 150.

The recording material P bearing the four color toner images is introduced into a fixing unit 30. The four color toners are melted and mixed by heating and pressurizing by the fixing unit 30 and are fixed to the recording material P. The toner remaining on the intermediate transfer belt 10 after the secondary transfer is removed by a cleaning device 17.

The cleaning device 17 has a cleaning blade or the like that comes into contact with the outer peripheral surface of the intermediate transfer belt 10, that scrapes off the toner remaining on the intermediate transfer belt 10, and that collects the toner in the intermediate transfer belt cleaning device 17. The intermediate transfer belt cleaning device 17 is located downstream of a secondary transfer portion of the intermediate transfer belt 10 in the rotational direction of the intermediate transfer belt 10 to collect the toner adhering to the intermediate transfer belt 10.

A full-color print image is formed by this operation.

2. Developer, Toner, and Transfer Promoting Particles

The developer, toner, and transfer promoting particles used in the present embodiment are described in detail below.

In the present embodiment, a mixture of toner and an external additive A serving as transfer promoting particles is used as a developer. The transfer promoting particles refer to particles that are interposed between the photosensitive drum 1 and a toner image developed on the photosensitive drum 1 to reduce the adhesion strength between the toner image and the photosensitive drum 1 and thereby improve the primary transfer efficiency of the toner image. Toner refers to a toner particle containing a toner base particle containing a release agent and an organosilicon polymer on the surface of the toner base particle.

The organosilicon polymer has a T3 unit structure represented by $R—Si(O_{1/2})_3$, wherein R denotes an alkyl or phenyl group having 1 to 6 carbon atoms, and forms a protrusion on the surface of the toner base particle.

The protrusion is in surface contact with the surface of the toner base particle, and the surface contact can be expected to have a significant effect of suppressing the movement, separation, and burying of the protrusion.

The degree of surface contact is described with reference to the schematic views of a protrusion illustrated in FIGS. 3, 4, 5, and 6.

Figure 3:
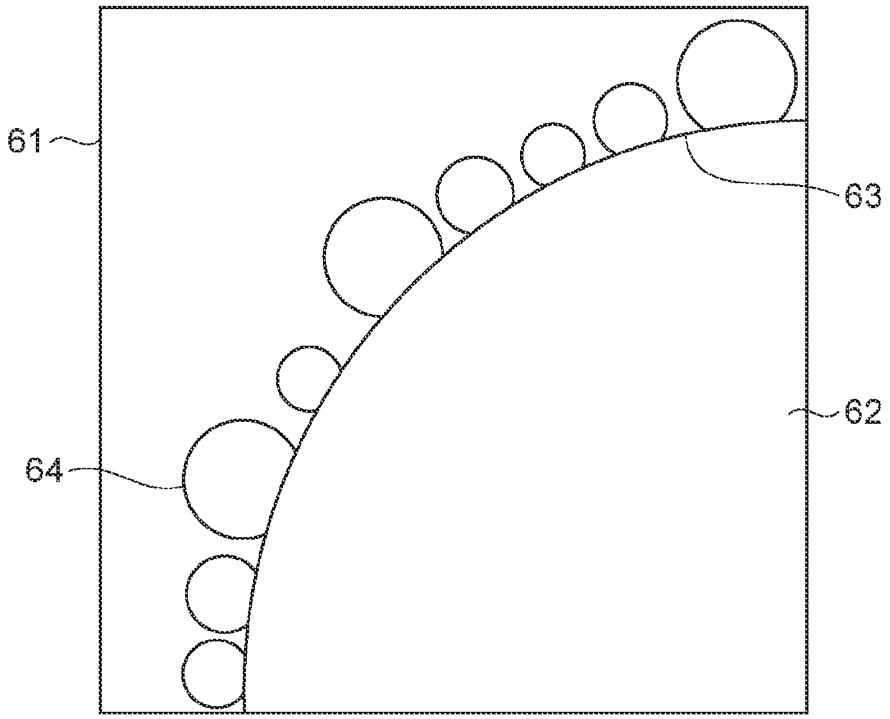
FIG. 3 is a schematic view of a toner surface in Embodiment 1.

In FIG. 3, 61 is a cross-sectional image of a toner particle in which approximately one fourth of the toner particle can be seen, 62 is the toner particle, 63 is the surface of the toner base particle, and 64 is a protrusion. A cross section of a toner particle can be observed with a scanning transmission electron microscope (hereinafter also referred to as STEM) described later.

A cross-sectional image of a toner is observed, and a line is drawn along the circumference of the surface of the toner base particle. The cross-sectional image is converted to a horizontal image on the basis of the line along the circumference. In the horizontal image, the length of a line along the circumference in a portion where a protrusion and the toner base particle form a continuous interface is defined as a protrusion width w.

The maximum length of the protrusion normal to the protrusion width w is defined as a protrusion diameter D. The length from the top of the protrusion to the line along the circumference in the line segment forming the protrusion diameter D is defined as a protrusion height H.

Figure 4:
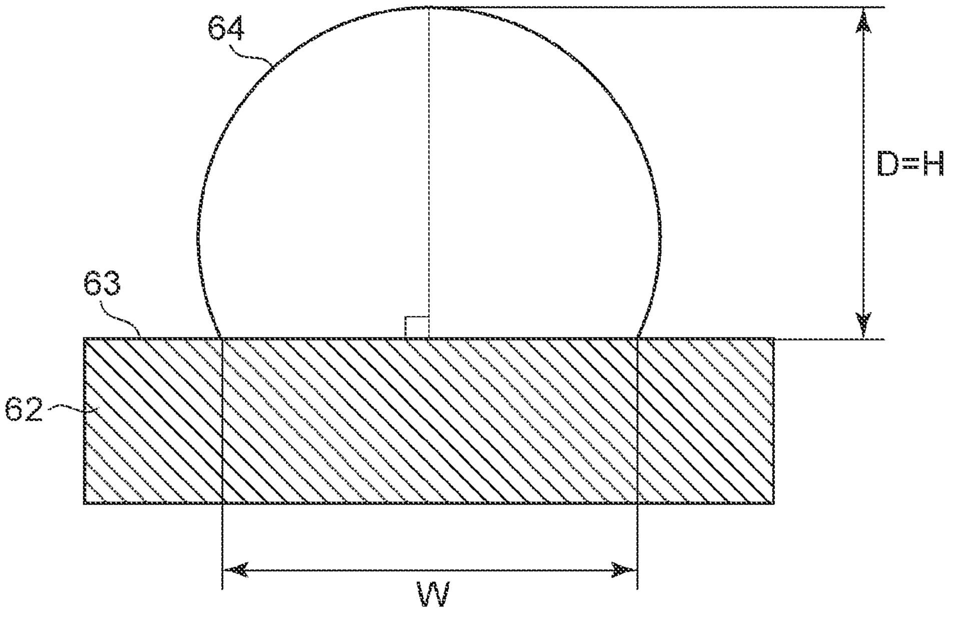
FIG. 4 is a schematic view of a protrusion shape on a toner surface in Embodiment 1.
Figure 5:
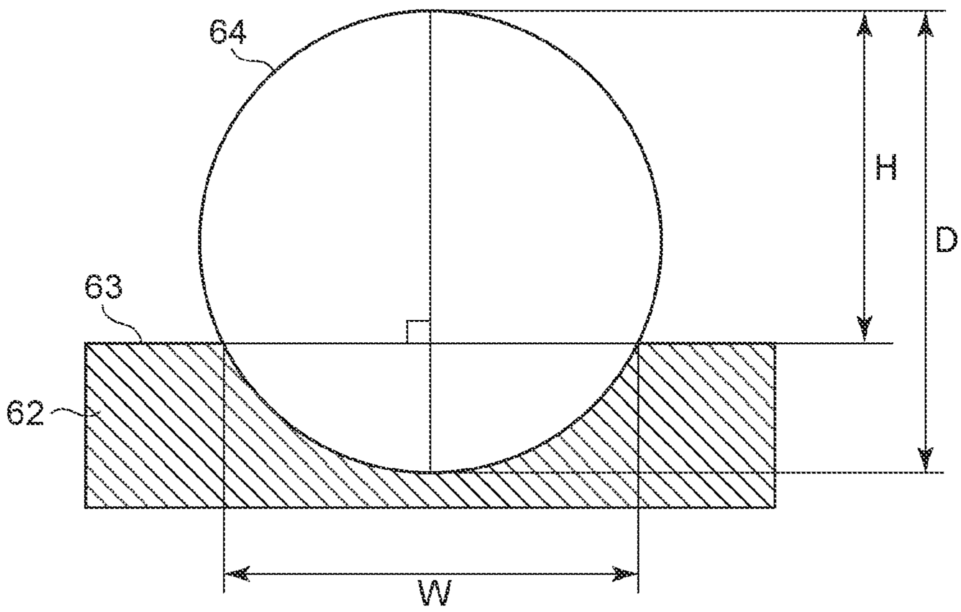
FIG. 5 is a schematic view of a protrusion shape on a toner surface in Embodiment 1.
Figure 6:
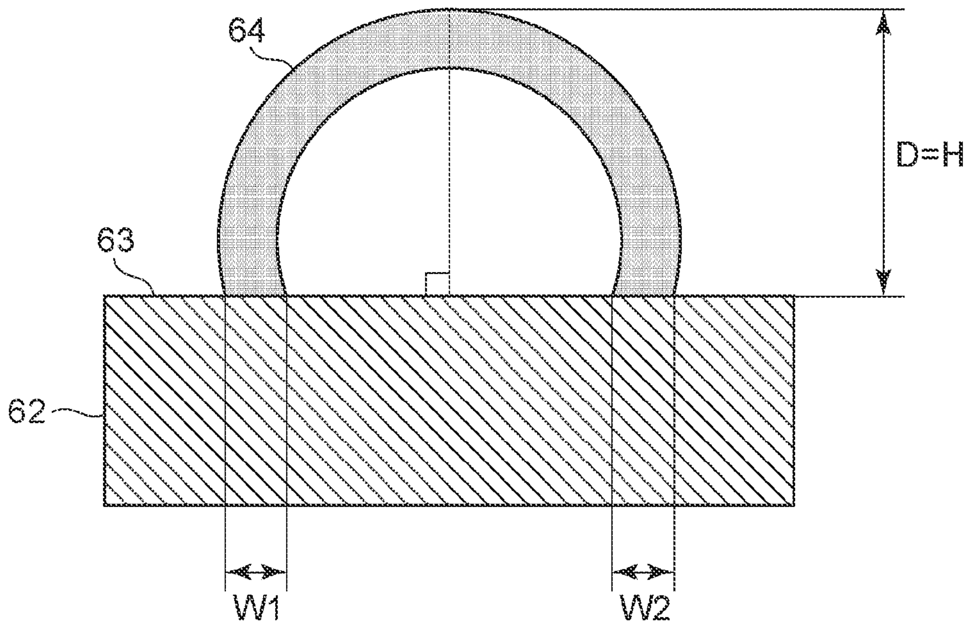
FIG. 6 is a schematic view of a protrusion shape on a toner surface in Embodiment 1.

In FIGS. 4 and 6, the protrusion diameter D and the protrusion height H are the same. In FIG. 5, the protrusion diameter D is larger than the protrusion height H.

FIG. 6 schematically illustrates the state of a fixed particle similar to a bowl-shaped particle, which is formed by breaking or dividing a hollow particle and has a hollow center.

In FIG. 6, the protrusion width W is the total length of an organosilicon polymer in contact with the surface of the toner base particle. Thus, the protrusion width W in FIG. 6 is the sum of W1 and W2.

The number average of the protrusion heights H ranges from 30 to 300 nm, preferably 30 to 200 nm. When the number average of the protrusion heights H is 30 nm or more, a spacer effect occurs between the surface of the toner base particle and a transfer member and significantly improves transferability. On the other hand, when the number average of the protrusion heights H is 300 nm or less, the effect of suppressing the movement, separation, and burying is significant, and high transferability is maintained even in long-term use. A cumulative distribution of the protrusion height H is determined in protrusions with a protrusion height H in the range of 30 to 300 nm. A protrusion height H80 corresponding to 80% in number of the accumulated protrusion height H from the lower value preferably ranges from 65 to 120 nm, more preferably 75 to 100 nm. H80 in such a range can result in further improved transferability.

The primary particles of the external additive A preferably have a number-average particle diameter R in the range of 30 to 1200 nm. R of 30 nm or more results in the spacer effect between the toner and the transfer member and high transferability. Transfer performance tends to be improved as R increases. R of more than 1200 nm, however, tends to result in the toner with poor flowability and an uneven image.

The ratio of the number-average particle diameter R of the primary particles of the external additive A to the number average of the protrusion heights H preferably ranges from 1.00 to 4.00. When the ratio [(the number-average particle diameter R of the primary particles of the external additive A)/(the number average of the protrusion heights H)] is in such a range, good transferability and low-temperature fixability can be achieved for long-term use.

When the number average of the protrusion heights H is the minimum value of 30 nm, R of 30 nm or more can result in the spacer effect between the toner and the transfer member and improved transferability. This is probably because the external additive A compensates for the absence of a protrusion caused by separation or the like and exerts the spacer effect. Thus, it is difficult to exhibit the spacer effect when R is less than 30 nm.

The adhesion rate of the external additive A on the surface of a toner particle preferably ranges from 0% to 20%, more preferably 0% to 10%. When the adhesion rate is in such a range, the external additive A can move easily on the surface of the toner particle and can further improve transferability due to the protrusion substitution effect. In a fixing step of fixing toner to the fixing member, an appropriate amount of release agent exudes from the toner base particle and improves the separation performance between the fixing member and the paper.

The surface of the toner is observed with a scanning electron microscope to acquire a backscattered electron image of a 1.5-μm square surface of the toner. When an image is binarized such that an organosilicon polymer portion in the backscattered electron image becomes a bright portion, the area percentage of the bright portion area of the image to the total area of the image (hereinafter also referred to simply as the area percentage of the bright portion area) ranges from 30.0% 75.0%. The area percentage of the bright portion area of the image preferably ranges from 35.0% to 70.0%. A higher area percentage of the bright portion area indicates a higher presence ratio of the organosilicon polymer on the surface of the toner base particle. When the area percentage of the bright portion area is more than 75.0%, the presence ratio of a component derived from the toner base particle on the surface of the toner base particle is decreased, the release agent is less likely to exude from the toner base particle, and a thin paper sheet is likely to be wound around the fixing unit during low-temperature fixation. On the other hand, when the area percentage of the bright portion area of the image is less than 30.0%, the presence ratio of a component derived from the toner base particle on the surface of the toner base particle is increased. This increases the area of a component derived from the toner base particle exposed to the surface of the toner base particle and reduces transferability in the initial stage of use. The area percentage of the bright portion area of the image is hereinafter also referred to as the coverage of the surface of the toner base particle with the organosilicon polymer.

As long as the primary particles have a number-average particle diameter R in the range of 30 to 1000 nm, the external additive A is not particularly limited and may be various organic or inorganic fine particles. The external additive A can contain fine silica particles from the perspective that such an external additive A easily imparts flowability and is easily negatively charged in the same manner as toner base particles. The silica fine particle content of the external additive A is preferably 50% or more by mass. The external additive A can be fine silica particles. The external additive A content of the toner preferably ranges from 0.02% to 5.00% by mass, more preferably 0.05% to 3.00% by mass.

Examples of organic or inorganic fine particles other than fine silica particles include the following:

(1) flowability imparting agents: fine alumina particles, fine titanium oxide particles, carbon black, and fluorocarbon;

(2) abrasives: fine particles of metal oxides (fine particles of strontium titanate, cerium oxide, alumina, magnesium oxide, chromium oxide, etc.), fine particles of nitrides (fine particles of silicon nitride, etc.), fine particles of carbides (fine particles of silicon carbide, etc.), and fine particles of metal salts (fine particles of calcium sulfate, barium sulfate, calcium carbonate, etc.);

(3) lubricants: fine particles of fluoropolymers (fine particles of vinylidene fluoride, polytetrafluoroethylene, etc.) and fine particles of fatty acid metal salts (fine particles of zinc stearate, calcium stearate, etc.); and (4) fine charge control particles: fine particles of metal oxides (fine particles of tin oxide, titanium oxide, zinc oxide, alumina, etc.) and carbon black.

The fine silica particles and the organic or inorganic fine particles may be subjected to hydrophobic treatment to improve the flowability of the toner and to make the charge of the toner particles uniform.

A treatment agent for the hydrophobic treatment may be an unmodified silicone varnish, a modified silicone varnish, an unmodified silicone oil, a modified silicone oil, a silane compound, a silane coupling agent, an organosilicon compound, or an organotitanium compound. These treatment agents may be used alone or in combination.

The fine silica particles may be known fine silica particles and may be fine dry silica particles or fine wet silica particles. The fine silica particles can be fine particles of wet silica produced by a sol-gel method (hereinafter also referred to as sol-gel silica).

Figure 7:
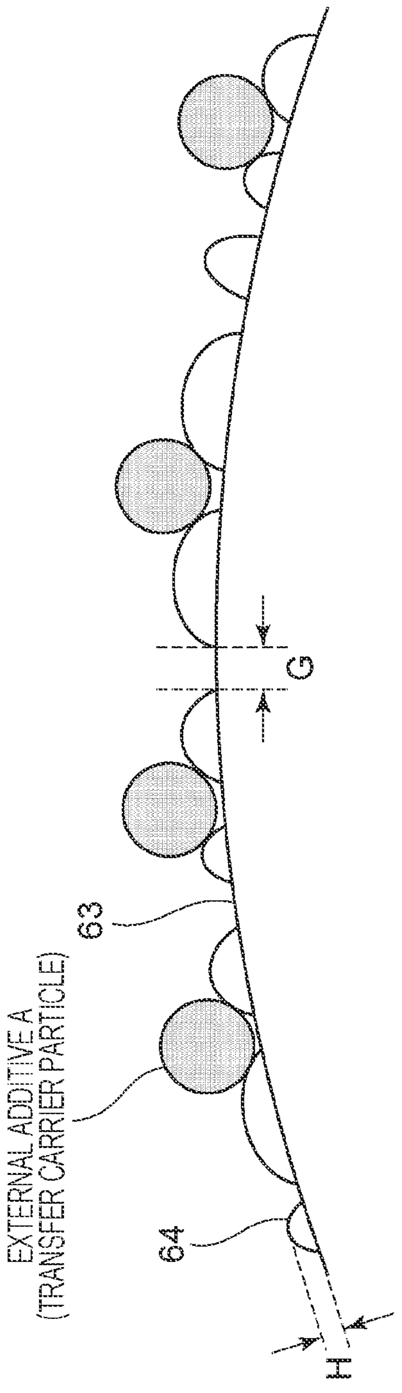
FIG. 7 is a schematic view of toner and transfer promoting particles in Embodiment 1.

FIG. 7 is an enlarged view of the developer used in the present embodiment. As illustrated in FIG. 7, the developer of the present embodiment contains the external additive A as transfer promoting particles on a toner surface with a large number of protrusions of an organosilicon polymer.

The protrusion interval G and the protrusion height H on the toner surface illustrated in FIG. 7 can be measured with a scanning transmission electron microscope (hereinafter also referred to as STEM) described later. The protrusion interval G and the protrusion height H can also be measured with a scanning probe microscope (hereinafter referred to as SPM). A scanning probe microscope (hereinafter referred to as SPM) has a probe, a cantilever for supporting the probe, and a displacement measurement system for detecting bending of the cantilever and detects an atomic force (attractive force or repulsive force) between the probe and a specimen to observe the surface profile of the specimen.

When the protrusion interval G is larger than a transfer promoting particle, a transfer promoting particle between the protrusions comes into contact with the toner base. This increases the adhesion strength Ft between the transfer promoting particle and the toner and makes it difficult for the transfer promoting particle to be transferred from the toner to the photosensitive drum 1. Thus, the number average of the protrusion intervals G can be smaller than the number-average particle diameter of the transfer promoting particles.

When the protrusion height H is larger than the particle diameter of a transfer promoting particle, the protrusion comes into contact with the photosensitive drum 1 before the transfer promoting particle. Thus, the transfer promoting particle cannot easily come into contact with the photosensitive drum 1 and cannot be easily transferred from the toner to the photosensitive drum 1. Thus, the number average of the protrusion heights H can be smaller than the number-average particle diameter of the transfer promoting particles.

As described above, the adhesion strength Ft between a transfer promoting particle and toner can be lower than the adhesion strength Fdr between the transfer promoting particle and the photosensitive drum 1. Thus, a material of the transfer promoting particles can be selected to decrease the adhesion strength Ft of the transfer promoting particle to the toner. For example, when the protrusions on the toner surface are formed of a silica material, such as an organic silica polymer, as in the present embodiment, a silica material with a material composition similar to that of the protrusions can be selected as a material of the transfer promoting particles to reduce the adhesion strength between the protrusions and the transfer promoting particles.

The number of transfer promoting particles deposited on toner can be increased to supply the transfer promoting particles from the development roller 41 to the photosensitive drum 1. However, a too large number of transfer promoting particles increase the risk of contamination of a member in the image-forming apparatus 100. Thus, the number of transfer promoting particles can be adjusted for desired primary transferability.

The primary transferability increases with the coverage of the photosensitive drum 1 with the transfer promoting particles. For sufficient primary transferability, the coverage of the photosensitive drum 1 with the transfer promoting particles is preferably 10% or more. As the coverage of the photosensitive drum 1 with the transfer promoting particles increases, however, the degree of improvement in primary transferability decreases, and the risk of contamination of a member in the image-forming apparatus with the transfer promoting particles increases. Thus, the coverage of the photosensitive drum 1 with the transfer promoting particles is preferably 50% or less.

3. Method for Measuring Physical Properties of Developer

Various measurement methods are described below.

<Method for Observing Cross Section of Toner with Scanning Transmission Electron Microscope (STEM)>

A cross section of toner to be observed with a scanning transmission electron microscope (STEM) is prepared as described below.

The procedure of preparing a cross section of toner is described below. When toner contains externally added organic or inorganic fine particles, the organic or inorganic fine particles are removed by the following method or the like to prepare a specimen.

160 g of sucrose (manufactured by Kishida Chemical Co., Ltd.) is dissolved in 100 mL of ion-exchanged water in a vessel in hot water to prepare a concentrated sucrose solution. A centrifugation tube (volume: 50 mL) is charged with 31 g of the concentrated sucrose solution and 6 mL of Contaminon N (a 10% by mass aqueous neutral detergent for cleaning precision measuring instruments composed of a nonionic surfactant, an anionic surfactant, and an organic builder, pH 7, manufactured by Wako Pure Chemical Industries, Ltd.). 1.0 g of toner is added to the centrifugation tube, and agglomerates of toner are triturated with a spatula. The centrifugation tube is shaken in a shaker (AS-1N sold by As One Corporation) at 300 strokes per minute (spm) for 20 minutes. After shaking, the solution is transferred to a glass tube for a swing rotor (50 mL) and is centrifuged in a centrifugal separator (H-9R manufactured by Kokusan Co., Ltd.) at 3500 rpm for 30 minutes. Toner particles are separated from an external additive by this operation. Sufficient separation of the toner particles from the aqueous solution is visually inspected, and the toner particles in the top layer are collected with a spatula. The collected toner particles are filtered through a vacuum filter and are dried in a dryer for one hour or more to prepare a test specimen. This operation is performed multiple times to prepare a required amount of test specimen.

Whether a protrusion contains an organosilicon polymer is determined also by elemental analysis using energy dispersive X-ray analysis (EDS).

A single layer of toner is spread on a cover glass (square cover glass, square No. 1, manufactured by Matsunami Glass Ind., Ltd.). An osmium (Os) plasma coater (OPC80T manufactured by Filgen, Inc.) is used to form an Os film (5 nm) and a naphthalene film (20 nm) as protective films on the toner. A PTFE tube (outer diameter: 3 mm (inner diameter: 1.5 mm)×3 mm) is then filled with a photocurable resin D800 (JEOL Ltd.), and the cover glass is gently placed on the tube in such a direction that the toner comes into contact with the photocurable resin D800. In this state, the resin is irradiated with light to be cured, and the cover glass and the tube are then removed to form a cylindrical resin in which the toner is embedded in the outermost surface. The outermost surface of the cylindrical resin is cut with an ultrasonic ultramicrotome (Leica, UC7) at a cutting speed of 0.6 mm/s in the length corresponding to the radius of the toner (for example, 4.0 μm when the weight-average particle diameter (D4) is 8.0 μm) to expose a cross section of the central portion of the toner.

The resin is then cut to a film thickness of 100 nm to prepare a thin sample of the cross section of the toner. A cross section of the central portion of the toner can be prepared by cutting in such a manner.

The scanning transmission electron microscope (STEM) was JEM-2800 manufactured by JEOL Ltd. The probe size of the STEM is 1 nm, and an image with an image size of 1024×1024 pixels is acquired. The Contrast and Brightness of the Detector Control panel of a bright-field image are adjusted to 1425 and 3750, respectively, and the Contrast of the Image Control panel is adjusted to 0.0. The Brightness and Gamma are adjusted to 0.5 and 1.00, respectively, to acquire an image. An image of one fourth to one half of the circumference of the cross section of a toner particle as illustrated in FIG. 3 is acquired at an image magnification of 100,000 times. The acquired STEM image is subjected to image analysis using image-processing software (Image J (available from https://imagej.nih.gov/ij/)) to measure protrusions containing the organosilicon polymer. Thirty protrusions arbitrarily selected from the STEM image are measured. Whether the protrusions contain the organosilicon polymer is determined by a combination of a scanning electron microscope (SEM) and elemental analysis using energy dispersive X-ray analysis (EDS). First, a line is drawn along the circumference of a toner base particle using a line drawing tool (select Segmented line on the Straight tab). When a protrusion of the organosilicon polymer is embedded in a toner base particle, lines are smoothly connected on the assumption that the protrusion is not embedded. Conversion to a horizontal image is performed on the basis of the line (select Selection on the Edit tab, change the line width to 500 pixels in properties, select Selection on the Edit tab, and perform Straightener). In the horizontal image, a protrusion containing the organosilicon polymer is measured as described below. The length of a line along the circumference in a portion where the protrusion and the toner base particle form a continuous interface is defined as a protrusion width w. The maximum length of the protrusion normal to the protrusion width w is defined as a protrusion diameter D. The length from the top of the protrusion to the line along the circumference in the line segment forming the protrusion diameter D is defined as a protrusion height H. The measurement is performed for arbitrarily selected 30 protrusions, and the arithmetic mean of measured values is taken as the number average of the protrusion heights H.

<Method for Calculating H80>

In a STEM image of a cross section of toner acquired with the scanning transmission electron microscope (STEM), the cumulative distribution of the protrusion heights H is determined for protrusions with a protrusion height H in the range of 30 to 300 nm. The protrusion height corresponding to 80% in number of the accumulated protrusion height H from the lower value is denoted by H80 (unit: nm).

<Method for Calculating Area Percentage of Bright Portion Area in 1.5-μm Square Backscattered Electron Image of Toner Surface>

For the area percentage of a bright portion area, the surface of toner is observed with a scanning electron microscope. A backscattered electron image of a 1.5-μm square surface of the toner is acquired. An image is then binarized such that an organosilicon polymer portion in the backscattered electron image becomes a bright portion, and the ratio of the bright portion area of the image to the total area of the image is determined. When toner contains externally added organic or inorganic fine particles, the organic or inorganic fine particles are removed by the following method or the like to prepare a specimen.

160 g of sucrose (manufactured by Kishida Chemical Co., Ltd.) is dissolved in 100 mL of ion-exchanged water in a vessel in hot water to prepare a concentrated sucrose solution. A centrifugation tube (volume: 50 mL) is charged with 31 g of the concentrated sucrose solution and 6 mL of Contaminon N (a 10% by mass aqueous neutral detergent for cleaning precision measuring instruments composed of a nonionic surfactant, an anionic surfactant, and an organic builder, pH 7, manufactured by Wako Pure Chemical Industries, Ltd.). 1.0 g of toner is added to the centrifugation tube, and agglomerates of toner are triturated with a spatula. The centrifugation tube is shaken in a shaker (AS-1N sold by As One Corporation) at 300 strokes per minute (spm) for 20 minutes. After shaking, the solution is transferred to a glass tube for a swing rotor (50 mL) and is centrifuged in the centrifugal separator (H-9R manufactured by Kokusan Co., Ltd.) at 3500 rpm for 30 minutes. Toner particles are separated from an external additive by this operation. Sufficient separation of the toner particles from the aqueous solution is visually inspected, and the toner particles in the top layer are collected with a spatula. The collected toner particles are filtered through a vacuum filter and are dried in a dryer for one hour or more to prepare a test specimen. This operation is performed multiple times to prepare a required amount of test specimen.

Whether a protrusion contains an organosilicon polymer is determined also by elemental analysis using energy dispersive X-ray analysis (EDS) described later.

The SEM apparatus and observation conditions are as follows:

Apparatus used: ULTRA PLUS manufactured by Carl Zeiss Microscopy GmbH
Accelerating voltage: 1.0 kV
WD: 2.0 mm
Aperture Size: 30.0 μm
Detected signal: energy-selective backscattered electron (EsB)
EsB Grid: 800 V
Observation magnification: 50,000 times
Contrast: 63.0±5.0% (reference value)
Brightness: 38.0±5.0% (reference value)

Resolution: 1024×768

Pretreatment: Toner particles are dispersed on a carbon tape (no depositing).

The accelerating voltage and EsB Grid are set to acquire structural information on the outermost surface of a toner particle, to prevent or suppress charge-up of an undeposited specimen, to selectively detect high-energy backscattered electrons, and the like. The observation field is selected near the top where the toner particle has the smallest curvature. A bright portion of the backscattered electron image derived from the organosilicon polymer was confirmed by superimposing an element mapping image acquired by energy dispersive X-ray analysis (EDS) with a scanning electron microscope (SEM) on the backscattered electron image.

The SEM/EDS apparatus and observation conditions are as follows:

Apparatus used (SEM): ULTRA PLUS manufactured by Carl Zeiss Microscopy GmbH

Apparatus used (EDS): NORAN System 7, Ultra Dry EDS Detector manufactured by Thermo Fisher Scientific Inc.

Accelerating voltage: 5.0 kV

WD: 7.0 mm

Aperture Size: 30.0 μm

Detected signal: SE2 (secondary electron)

Observation magnification: 50,000 times

Mode: Spectral Imaging

Pretreatment: Toner particles are dispersed on a carbon tape, and platinum is sputtered.

A mapping image of silicon element acquired by this method is superimposed on the backscattered electron image to confirm that a silicon atom portion of the mapping image matches the bright portion of the backscattered electron image.

The area percentage of the bright portion area to the total area of the backscattered electron image was calculated by analyzing the backscattered electron image of the surface of the toner particle acquired by the above method using image-processing software ImageJ (developed by Wayne Rashand). The procedure is described below.

First, a backscattered electron image is converted to 8-bit using Type of the Image menu. Using Filters of the Process menu, the Median size is then set to 2.0 pixels to reduce image noise. The center of the image is estimated after removing an observation condition display section displayed in a lower portion of the backscattered electron image, and a 1.5-μm square range around the center of the backscattered electron image is selected using Rectangle Tool on the toolbar. Then select Threshold from Adjust on the Image menu. Select Default, click Auto, and then click Apply to acquire a binarized image. A bright portion of the backscattered electron image is displayed in white by this operation. Again, the center of the image is estimated after removing an observation condition display section displayed in a lower portion of the backscattered electron image, and a 1.5-μm square range around the center of the backscattered electron image is selected using Rectangle Tool on the toolbar. Then select Histogram from the Analyze menu. Read a Count value from a newly opened Histogram window (corresponds to the total area of the backscattered electron image). Click List to read the Count value at brightness 0 (corresponding to the bright portion area of the backscattered electron image). From these values, the area percentage of the bright portion area to the total area of the backscattered electron image is calculated. This procedure is performed in 10 fields of a toner particle to be evaluated to calculate the number average and obtain the area percentage (%) of the bright portion area of an image binarized such that the organosilicon polymer portion in the backscattered electron image becomes the bright portion to the total area of the image.

<Method for Identifying Organosilicon Polymer>

A method for identifying an organosilicon polymer is performed by a combination of scanning electron microscope (SEM) observation and elemental analysis using energy dispersive X-ray analysis (EDS).

Toner is observed in a field magnified up to 50,000 times with a scanning electron microscope "Hitachi ultrahigh resolution field-emission scanning electron microscope S-4800" (Hitachi High-Technologies Corporation) The surface of a toner particle is focused and observed. Particles and the like on the surface are subjected to EDS analysis to determine whether the analyzed particles and the like are formed of an organosilicon polymer from the presence or absence of a Si element peak. When both an organosilicon polymer and fine silica particles are present on the surface of a toner particle, the organosilicon polymer is identified by comparing the ratio of the Si element content (atomic %) to the O element content (atomic %) (Si/O ratio) with that of an authentic sample. EDS analysis is performed on each authentic sample of the organosilicon polymer and the fine silica particles under the same conditions to determine the Si and O element contents (atomic %). The Si/O ratio of the organosilicon polymer is denoted by A, and the Si/O ratio of the fine silica particles is denoted by B. Measurement conditions under which A is significantly larger than B are selected. More specifically, an authentic sample is measured 10 times under the same conditions to obtain the arithmetic mean values of A and B. Measurement conditions under which the mean values satisfy $A/B>1.1$ are selected. When the Si/O ratio of a particle or the like to be identified is closer to A than $[(A+B)/2]$, the particle or the like is judged to be an organosilicon polymer.

An authentic sample of organosilicon polymer particles is Tospearl 120A (Momentive Performance Materials Japan LLC). An authentic sample of fine silica particles is HDK V15 (Asahi Kasei Corporation).

<Method for Measuring Number-Average Particle Diameter R of Primary Particles of External Additive>

The scanning electron microscope "Hitachi ultrahigh resolution field-emission scanning electron microscope S-4800" (Hitachi High-Technologies Corporation) and elemental analysis using energy dispersive X-ray analysis (EDS) are combined.

The elemental analysis method using EDS is also used to randomly photograph an external additive particle in a field magnified up to 50,000 times. One hundred external additive particles are randomly selected from a captured image. The long diameters of primary particles of the external additive particles to be measured are measured, and the arithmetic mean thereof is defined as a number-average particle diameter R. The observation magnification is appropriately adjusted for the size of the external additive particles.

<Method for Determining Composition and Ratio of Constituent Compounds of Organosilicon Polymer>

The composition and ratio of constituent compounds of an organosilicon polymer in toner is determined by NMR. Toner containing an external additive, such as fine silica particles, in addition to an organosilicon polymer is subjected to the following operation.

One gram of toner is dissolved and dispersed in 31 g of chloroform in a vial. An ultrasonic homogenizer is used for the dispersion for 30 minutes to prepare a dispersion liquid.

Sonicator: ultrasonic homogenizer VP-050 (manufactured by Taitec Corporation)

Microtip: step-type microtip, tip diameter ϕ 2 mm

Tip position of microtip: at the center of a glass vial and 5 mm above the bottom of the vial Ultrasonic conditions: intensity 30%, 30 minutes Ultrasonic waves are applied while the vial is cooled with ice water to prevent an increase in the temperature of the dispersion liquid. The dispersion liquid is transferred to a glass tube for a swing rotor (50 mL) and is centrifuged in the centrifugal separator (H-9R manufactured by Kokusan Co., Ltd.) at 58.33 $s^{-1}$ for 30 minutes. In the glass tube after the centrifugation, the lower layer contains particles with a high specific gravity, for example, fine silica particles. A chloroform solution containing the organosilicon polymer in the upper layer is collected, and the chloroform is removed by vacuum drying (40° C./24 hours) to prepare a sample. Using the sample or the organosilicon polymer, the abundance ratio of the constituent compounds of the organosilicon polymer and the proportion of a T3 unit structure represented by $R—Si(O_{1/2})_3$ in the organosilicon polymer are measured and calculated by solid-state $^{29}$Si-NMR.

First, a hydrocarbon group represented by R is identified by $^{13}$C-NMR.

<<Measurement Conditions for $^{13}$C-NMR (Solid-State)>>

Apparatus: JNM-ECX500II manufactured by JEOL RESONANCE

Specimen tube: 3.2 mmϕ

Specimen: sample or organosilicon polymer

Measurement temperature: room temperature

Pulse mode: CP/MAS

Measurement nuclear frequency: 123.25 MHz ($^{13}$C)

Reference substance: adamantane (external standard: 29.5 ppm)

Specimen rotation speed: 20 kHz

Contact time: 2 ms

Delay time: 2 s

Number of scans: 1024

In the method, the hydrocarbon group represented by R is identified by the presence or absence of a signal attributed to a methyl group ($Si—CH_3$), an ethyl group ($Si—C_2H_5$), a propyl group ($Si—C_3H_7$), a butyl group ($Si—C_4H_9$), a pentyl group ($Si—C_5H_{11}$), a hexyl group ($Si—C_6H_{13}$), a phenyl group ($Si—C_6H_5—$), or the like bonded to the silicon atom. On the other hand, in solid-state $^{29}$Si-NMR, a peak is detected in a different shift region depending on the structure of a functional group bonded to Si of a constituent compound of the organosilicon polymer. Each peak position can be determined using a standard sample to identify the structure bonded to Si. The abundance ratio of each constituent compound can be calculated from its peak area. The ratio of the peak area of the T3 unit structure to the total peak area can be calculated.

The measurement conditions for solid-state$^{29}$Si-NMR are as follows:

Apparatus: JNM-ECX5002 (JEOL RESONANCE)

Temperature: room temperature

Measurement method: DDMAS method $^{29}$Si 45 degrees

Specimen tube: zirconia 3.2 mmϕ

Specimen: powder in test tube

Specimen rotation speed: 10 kHz

Relaxation delay: 180 s

Scan: 2000

After the measurement, a plurality of silane components with different substituents and linking groups in the sample or the organosilicon polymer are peak-separated into the following X1 structure, X2 structure, X3 structure, and X4 structure by curve fitting, and the peak areas thereof are calculated.

The X3 structure is the T3 unit structure.

X1 structure: $(Ri)(Rj)(Rk)SiO_{1/2}$ (A1)

X2 structure: $(Rg)(Rh)Si(O_{1/2})_2$ (A2)

X3 structure: $RmSi(O_{1/2})_3$ (A3)

X4 structure: $Si(O_{1/2})_4$ (A4)

X1 structure:

(A1)

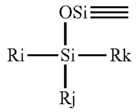

X2 structure:

(A2)

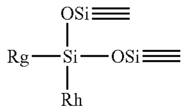

X3 structure:

(A3)

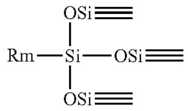

X4 structure:

(A4)

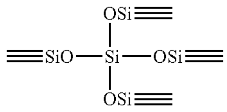

In the formulae (A1), (A2), and (A3), Ri, Rj, Rk, Rg, Rh, and Rm represent an organic group, such as a hydrocarbon group having 1 to 6 carbon atoms, a halogen atom, a hydroxy group, an acetoxy group, or an alkoxy group, bonded to silicon. To identify the structure in more detail, the structure may be identified by $^{1}$H-NMR measurement results together with the $^{13}$C-NMR and $^{29}$Si-NMR measurement results.

<Method for Determining Amount of Organosilicon Polymer or Fine Silica Particles in Toner>

Toner is dispersed in chloroform as described above and is then centrifuged to separate an external additive, such as an organosilicon polymer or fine silica particles, according to the difference in specific gravity and prepare a sample. The external additive content, such as the organosilicon polymer content or the fine silica particle content, is determined.

In the following examples, the external additive is fine silica particles. Other fine particles can also be quantitatively determined in the same way.

First, pressed toner is subjected to fluorescent X-ray measurement and is analyzed, for example, by a calibration curve method or an FP method to determine the silicon content of the toner. The structure of each constituent compound forming the organosilicon polymer and the fine silica particles is determined by solid-state$^{29}$Si-NMR, pyrolysis GC/MS, or the like, and the silicon content of the organosilicon polymer and the fine silica particles is determined. The organosilicon polymer content and the fine silica particle content of the toner are calculated from the relationship between the silicon content of the toner determined using fluorescent X-rays and the silicon content of the organosilicon polymer and the fine silica particles determined by solid-state $^{29}$Si-NMR and pyrolysis GC/MS.

<Method for Measuring Adhesion Rate of External Additive, Such as Organosilicon Polymer or Fine Silica Particle, to Toner Base Particle or Toner Particle by Water Washing Method>

Water Washing Step 20 g of "Contaminon N" (a 30% by mass aqueous neutral detergent for cleaning precision measuring instruments composed of a nonionic surfactant, an anionic surfactant, and an organic builder, pH 7) is weighed in a 50-mL vial and is mixed with 1 g of toner. The vial is shaken using a "KM Shaker" (model: V.SX) manufactured by Iwaki Co., Ltd. at a speed of 50 for 120 seconds. Depending on the adhesion state of the organosilicon polymer or the fine silica particles, the external additive, such as the organosilicon polymer or the fine silica particles, is transferred from the surface of toner base particles or toner particles to the dispersion liquid. The toner is separated with the centrifugal separator (H-9R manufactured by Kokusan Co., Ltd.) (at 16.67 $s^{-1}$ for 5 minutes) from the external additive, such as the organosilicon polymer or the fine silica particles, that has moved to the supernatant liquid. Precipitated toner is dried under vacuum to dryness (40° C./24 hours) and is washed with water to prepare toner.

The toner not subjected to the water washing step (toner before water washing) and the toner subjected to the water washing step (toner after water washing) are then photographed with the Hitachi ultrahigh resolution field-emission scanning electron microscope S-4800 (Hitachi High-Technologies Corporation).

An object to be measured is identified by elemental analysis using energy dispersive X-ray analysis (EDS).

A captured toner surface image is then analyzed using image analysis software Image-Pro Plus ver. 5.0 (Nippon Roper, K.K.) to calculate the coverage.

The image capturing conditions for the S-4800 are as follows:

(1) Specimen Preparation

A conductive paste is thinly applied to a specimen stage (aluminum specimen stage 15 mm×6 mm) and is sprayed with toner. Excess toner is removed from the specimen stage by air blowing. The conductive paste is thoroughly dried. The specimen stage is placed in a specimen holder. The specimen stage height is adjusted to 36 mm using a specimen height gage.

(2) Observation Condition Setting for S-4800

To measure the coverage, the elemental analysis by energy dispersive X-ray analysis (EDS) described above is performed in advance to distinguish the external additive, such as the organosilicon polymer or the fine silica particles, on the toner surface in the measurement. An anti-contamination trap attached to the housing of the S-4800 overflowing with liquid nitrogen is left for 30 minutes. Actuate "PC-SEM" of the S-4800, and perform flushing (cleaning of an electron source FE chip). Click an accelerating voltage indication of a control panel on the screen, and press a [flushing] button to open a flushing dialog. Confirm that the flushing intensity is 2, and perform flushing. Confirm that the emission current by flushing ranges from 20 to 40 μA. Insert the specimen holder into a specimen chamber in the S-4800 housing. Press a [Starting point] on the control panel to move the specimen holder to the observation position.

Click the accelerating voltage indication to open an HV setting dialog, and set the accelerating voltage at [1.1 kV] and the emission electric current at [20 μA]. In a [Basis] tab on the operation panel, set the signal selection at [SE], select [Up (U)] and [+BSE] for an SE detector, and select [L.A.100] in a selection box on the right side of [+BSE] to adopt a backscattered electron image observation mode. In the same [Basis] tab on the operation panel, set the probe current of the electron optical system condition block at [Normal], and set the focal point mode at [UHR] and WD at [4.5 mm]. Press an [ON] button of the accelerating voltage indication on the control panel to apply the accelerating voltage.

(3) Calculation of Number-Average Particle Diameter (D1) of Toner

Drag a magnification indication on the control panel to set the magnification at 5000 (5 k) times. Rotate a focus knob [COARSE] on the operation panel to adjust the focus to some extent, and adjust the aperture alignment. Click an [Align] on the control panel to display an alignment dialog, and select [Beam]. Rotate STIGMA/ALIGNMENT knobs (X, Y) on the operation panel to move an indicated beam to the center of concentric circles. Then select an [Aperture], and rotate each of the STIGMA/ALIGNMENT knobs (X, Y) to stop or minimize the movement of an image. Close the aperture dialog, and adjust the focus by autofocusing. This operation is repeated twice to adjust the focus.

The particle diameter of 300 toner particles is then measured to determine the number-average particle diameter (D1). The particle diameter of each particle is the maximum diameter observed in the toner particle.

(4) Focus Adjustment

For particles with the number-average particle diameter (D1) determined in (3)±0.1 μm, while the midpoint of the maximum diameter is matched to the center of the measurement screen, drag the magnification indication on the control panel to set the magnification at 10000 (10 k) times.

Rotate a focus knob [COARSE] on the operation panel to adjust the focus to some extent, and adjust the aperture alignment. Click an [Align] on the control panel to display an alignment dialog, and select [Beam]. Rotate STIGMA/ALIGNMENT knobs (X, Y) on the operation panel to move an indicated beam to the center of concentric circles. Then select an [Aperture], and rotate each of the STIGMA/ALIGNMENT knobs (X, Y) to stop or minimize the movement of an image. Close the aperture dialog, and adjust the focus by autofocusing. Subsequently, set the magnification at 50,000 (50 k) times, perform focus adjustment with the focus knob and the STIGMA/ALIGNMENT knobs in the same manner as described above, and adjust the focus again by autofocusing. This operation is repeated to adjust the focus. The accuracy of measurement of the coverage tends to decrease with the increasing tilt angle of the observation surface. Thus, the observation surface is selected such that the focus can be entirely adjusted at a time in focus adjustment, and a surface with a minimum tilt is selected and analyzed.

(5) Image Storage

Adjust brightness in an ABC mode, and take and store a photograph with a size of 640×480 pixels. Use this image file to perform the following analysis. Take a photograph for each toner to acquire an image of toner particles.

(6) Image Analysis

The image thus acquired is binarized using the following analysis software to calculate the coverage. One screen is divided into 12 squares, which are individually analyzed. The analysis conditions of the image analysis software Image-Pro Plus ver. 5.0 are described below. If any of the squares contains an external additive, such as an organosilicon polymer with a particle diameter of less than 30 nm and more than 300 nm or fine silica particles with a particle diameter of less than 30 nm and more than 1200 nm, the coverage is not calculated in the square.

In the image analysis software Image-Pro Plus ver. 5.0, select "Count/Size" and then "Option" from "Measurement" on the toolbar, and set the binarization conditions. Select 8 coupling in the object extraction option, and set the smoothing to 0. In addition, do not select pre-selection, filling hole, and comprehensive line, and set "Exclude Borderline" to "None". Select "Measurement Item" from "Measurement" on the toolbar, and input 2 to $10^7$ in the area selection range.

The coverage is calculated around a square region. Select the area (C) of the region in the range of 24,000 to 26,000 pixels. "Processing"—Perform automatic binarization for binarization, and calculate the sum (D) of the areas of regions without the external additive, such as the organosilicon polymer or the fine silica particles. The coverage can be obtained using the following formula from the area C of the square region and the sum D of the areas of the regions without the external additive, such as the organosilicon polymer or the fine silica particles.

$$\text{Coverage }(\%)=100-(D/C\times 100)$$

The arithmetic mean of all the data is defined as the coverage.

The coverages with the toner before water washing and with the toner after water washing are calculated, and [coverage with toner after water washing]/[coverage with toner before water washing]×100 is defined as the "adhesion rate" in the present disclosure.

4. Method for Producing Toner Particles, External Additive, and Developer

Next, production examples of the toner particles, the external additive A, and the developer of the present embodiment are described below.

Production Example of Toner Particles

Preparation of Aqueous Medium 1

A reaction vessel equipped with a stirrer, a thermometer, and a reflux tube was charged with 650.0 parts of ion-exchanged water and 14.0 parts of sodium phosphate (dodecahydrate, manufactured by Rasa Industries, Ltd.) and was kept warm at 65° C. for 1.0 hour while being purged with nitrogen. While the mixture was stirred at 15,000 rpm with a T.K. homomixer (manufactured by Tokushu Kika Kogyo Co., Ltd.), an aqueous calcium chloride containing 9.2 parts of calcium chloride (dihydrate) dissolved in 10.0 parts of ion-exchanged water was added at once to the mixture to prepare an aqueous medium containing a dispersion stabilizer. Furthermore, 10% by mass hydrochloric acid was added to the aqueous medium to adjust the pH to 5.0, thereby preparing an aqueous medium 1.

Preparation of Polymerizable Monomer Composition

Styrene: 60.0 parts

C.I. Pigment Blue 15:3: 6.5 parts

These materials were charged into an attritor (manufactured by Mitsui Miike Machinery Co., Ltd.) and were dispersed using zirconia particles with a diameter of 1.7 mm at 220 rpm for 5.0 hours. The zirconia particles were then removed to prepare a colorant dispersion liquid.

Styrene: 20.0 parts n-Butyl acrylate: 20.0 parts

Cross-linker (divinylbenzene): 0.3 parts

Saturated polyester resin: 5.0 parts (a polycondensate of propylene-oxide-modified bisphenol A (2-mol adduct) and terephthalic acid (mole ratio 10:12), glass transition temperature (Tg): 68° C., weight-average molecular weight (Mw): 10,000, molecular weight distribution (Mw/Mn): 5.12)

Fischer-Tropsch wax (melting point 78° C.): 7.0 parts

These materials were added to the colorant dispersion liquid, were heated to 65° C., and were uniformly dissolved and dispersed at 500 rpm with the T.K. homomixer (manufactured by Tokushu Kika Kogyo Co., Ltd.) to prepare a polymerizable monomer composition.

Granulation Step

The temperature of the aqueous medium 1 was adjusted to 70° C. The polymerizable monomer composition was added to the aqueous medium 1 while maintaining the rotation speed of the T.K. homomixer at 15,000 rpm, and 10.0 parts of a polymerization initiator t-butyl peroxypivalate was added thereto. The mixture was granulated for 10 minutes while maintaining the mixer at 15,000 rpm.

Polymerization Step and Distillation Step

After the granulation step, the stirrer was replaced with a propeller impeller blade, and polymerization was performed at 70° C. for 5.0 hours and then at 85° C. for 2.0 hours with stirring at 150 rpm. The reflux tube of the reaction vessel was then replaced with a cooling tube, and the resulting slurry was heated to 100° C. for distillation for 6 hours to evaporate the unreacted polymerizable monomer, thereby preparing a resin particle dispersion liquid.

Step of Forming Organosilicon Polymer

A reaction vessel equipped with a stirrer and a thermometer was charged with 60.0 parts of ion-exchanged water, and the pH was adjusted to 4.0 using 10% by mass hydrochloric acid. The ion-exchanged water was heated with stirring to a temperature of 40° C. 40.0 parts of an organosilicon compound methyltriethoxysilane was added to the ion-exchanged water, which was then stirred for 2 hours or more for hydrolysis. The endpoint of the hydrolysis was visually confirmed when oil and water did not separate and formed a single layer. The product was cooled to prepare a hydrolysate of the organosilicon compound.

The temperature of the resin particle dispersion liquid was adjusted to 55° C., and 25.0 parts of the hydrolysate of the organosilicon compound (the amount of the organosilicon compound added was 10.0 parts) was then added to initiate polymerization of the organosilicon compound. The liquid was kept for 0.25 hours and was then adjusted to pH 5.5 with 3.0% aqueous sodium hydrogen carbonate. The liquid was kept for 1.0 hour with stirring at 55° C. (condensation reaction 1), was then adjusted to pH 9.5 with 3.0% aqueous sodium hydrogen carbonate, and was kept for another 4.0 hours (condensation reaction 2) to prepare a toner-particle dispersion liquid.

Washing Step and Drying Step

After completion of the step of forming the organosilicon polymer, the toner-particle dispersion liquid was cooled, was adjust to pH 1.5 or less with hydrochloric acid, and was left for 1.0 hour with stirring. Solid-liquid separation was then performed with a pressure filter to prepare a toner cake. The toner cake was reslurried with ion-exchanged water to prepare a dispersion liquid again, which was then subjected to solid-liquid separation with the filter to prepare a toner cake. The toner cake was transferred to a constant temperature bath at 40° C. and was dried and classified for 72 hours to prepare toner particles.

Production Example of External Additive A

The external additive A was prepared as described below. A 1.5-L glass reaction vessel equipped with a stirrer, a dropping nozzle, and a thermometer was charged with 150 parts of 5% aqueous ammonia to prepare an alkaline catalyst solution. The temperature of the alkaline catalyst solution was adjusted to 50° C., and 100 parts of tetraethoxysilane and 50 parts of 5% aqueous ammonia were then simultaneously added dropwise with stirring. The mixture was allowed to react for 8 hours to prepare a fine silica particle dispersion liquid. The fine silica particle dispersion liquid was then spray-dried and was crushed with a pin mill to prepare fine silica particles with a number-average primary particle diameter of 100 nm as the external additive A.

Production Example of Developer

A Henschel mixer (FM10C manufactured by Nippon Coke & Engineering Co., Ltd.) with a jacket through which water was passed at 7° C. was charged with 100.00 parts of toner particles 1 and 1.00 part of the external additive A. After the water temperature in the jacket was stabilized at 7° C.±1° C., the toner particles 1 and the external additive A were mixed for 10 minutes at a rotor blade peripheral speed of 38 m/s. While mixing, the water flow rate in the jacket was appropriately controlled so that the temperature in the vessel of the Henschel mixer did not exceed 25° C. The mixture thus prepared was sieved through a mesh with a mesh size of 75 μm to prepare a developer.

Table 1 shows physical properties of the developer.

TABLE 1

| Number average of protrusion heights H (nm) | Number average of protrusion intervals G (nm) | H80 (nm) | Area percentage of bright portion area (%) | Adhesion rate of organosilicon polymer (%) | Type of external additive A | Number-average particle diameter R of primary particles of external additive A (nm) | X | Adhesion rate of external additive A (%) |
|---|---|---|---|---|---|---|---|---|
| 50 | 30 | 75 | 60.0 | 99 | silica | 100 | 2.00 | 7 |

“X” in the table denotes the ratio of the number-average particle diameter R of the primary particles of the external additive A to the number average of the protrusion heights H. SEM observation of the developer thus prepared showed that the external additive A was present as transfer promoting particles on protrusions of the organosilicon polymer of the toner particles, and the average number of deposited particles of the external additive A per toner particle was approximately 500.

5. Structure of Intermediate Transfer Belt

Figure 8:
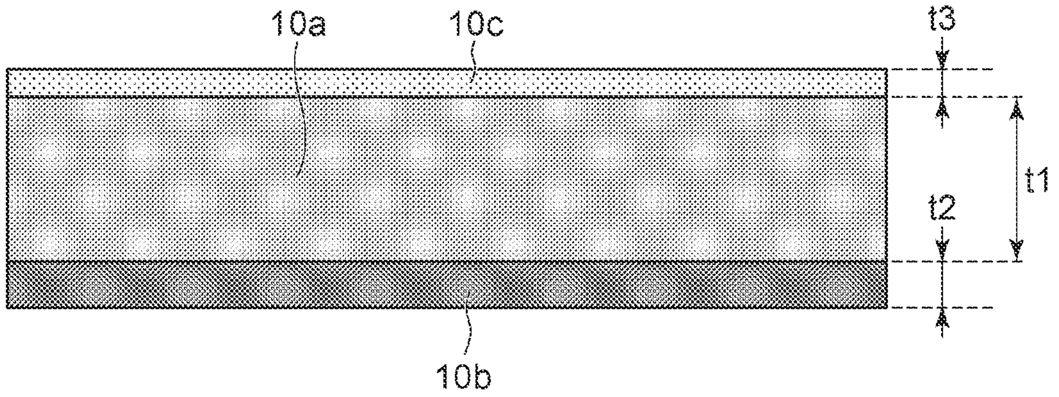
FIG. 8 is a cross-sectional view of an intermediate transfer belt in Embodiment 1.

FIG. 8 is a schematic view of a cross section of the intermediate transfer belt 10 in the present embodiment viewed in the axial direction of the primary transfer roller 14. The intermediate transfer belt 10 has a circumferential length of 700 mm and a thickness of 92 μm and is formed of a base layer 10*a* (first layer), an inner surface layer 10*b* (second layer), and a surface layer 10*c* (third layer). The base layer 10*a* was formed of endless poly(vinylidene difluoride) (PVdF) containing an ion conductive agent, such as a polyvalent metal salt or a quaternary ammonium salt, as a conducting agent. The inner surface layer 10*b* was formed of an acrylic resin containing carbon as a conducting agent. The surface layer 10*c* was formed of an acrylic resin containing a metal oxide as a conducting agent.

The base layer 10*a* is the thickest layer of the layers constituting the intermediate transfer belt 10 in the thickness direction of the intermediate transfer belt 10. In the present embodiment, the inner surface layer 10*b* is a layer formed on the inner peripheral surface side of the intermediate transfer belt 10. In the thickness direction, which is a direction across the movement direction of the intermediate transfer belt 10, the base layer 10*a* is formed closer to the photosensitive drums 1*a* to 1*d* than the inner surface layer 10*b*, and the surface layer 10*c* is formed closer to the photosensitive drums 1*a* to 1*d* than the base layer 10*a*. In the present embodiment, the inner surface layer 10*b* of the intermediate transfer belt 10 was formed by spray-coating the base layer 10*a*. The thickness t1 of the base layer 10*a*, the thickness t2 of the inner surface layer 10*b*, and the thickness t3 of the surface layer 10*c* are 87 μm, 3 μm, and 2 μm, respectively.

Although the base layer 10*a* was formed of poly(vinylidene difluoride) (PVdF) in the present embodiment, the base layer 10*a* may be formed of another material, for example, polyimide, polycarbonate, polyarylate, polyester, an acrylonitrile-butadiene-styrene copolymer (ABS), or a mixture thereof. Furthermore, although the inner surface layer 10*b* was formed of an acrylic resin in the present embodiment, the inner surface layer 10*b* may be formed of another material, for example, polyester.

The conducting agent to be added to the base layer 10*a* may be carbon as an electrically conductive agent or a high-molecular-weight or low-molecular-weight conducting agent as an ion conductive agent. For example, the high-molecular-weight type may be a nonionic type, such as polyether ester amide, poly(ethylene oxide)-epichlorohydrin, or polyether ester, a cationic type, such as an acrylate polymer with a quaternary ammonium group, or an anionic type, such as poly(styrene sulfonate). The low-molecular-weight type may be a nonionic type, such as a derivative with an ether group or a derivative containing an ether ester. The low-molecular-weight type may also be a cationic type, such as a primary, secondary, or tertiary ammonium salt, a quaternary ammonium salt, or a derivative thereof, or an anionic type, such as a carboxylate, sulfate, sulfonate, phosphate, or a derivative thereof. These high-molecular-weight or low-molecular-weight ion conductive agents can be used alone or in combination. Among them, quaternary ammonium salts, sulfonates, polyether ester amides, and the like can be used in terms of heat resistance and conductivity.

In the present embodiment, the base layer 10*a*, the inner surface layer 10*b*, and the surface layer 10*c* of the intermediate transfer belt 10 have different electrical resistances, and the inner surface layer 10*b* has a lower electrical resistance than the base layer 10*a* and the surface layer 10*c*.

In the intermediate transfer belt 10, the surface resistivity measured on the outer peripheral surface side (the surface layer 10*c* side) is defined as the combined electrical resistance of the surface layer 10*c* and the base layer 10*a*, and the surface resistivity measured on the inner peripheral surface side (the inner surface layer 10*b* side) is defined as the electrical resistance of the inner surface layer 10*b*. Thus, the intermediate transfer belt 10 of the present embodiment has different surface resistivities on the outer peripheral surface side and on the inner peripheral surface side, and the surface resistivity measured on the inner peripheral surface side is lower than the surface resistivity measured on the outer peripheral surface side. In the reference atmosphere (temperature: 23° C., humidity: 50%), the intermediate transfer belt 10 had a surface resistivity of $2.6\times10^{11}$ ohms per square on the outer peripheral surface side and $1.0\times10^{6}$ ohms per square on the inner peripheral surface side.

Without the surface layer 10*c*, the surface resistivity measured on the outer peripheral surface side was $2.0\times10^{10}$ ohms per square.

The surface resistivity of the intermediate transfer belt 10 was measured with Hiresta-UP (MCP-HT450) manufactured by Mitsubishi Chemical Corporation at a temperature of 23° C. and at a humidity of 50%. The surface resistivity was measured with a ring probe type UR100 (type MCP-HTP16) at an applied voltage of 10 [V] for a measurement time of 10 seconds. The surface resistivity on the inner peripheral surface side of the intermediate transfer belt 10 was measured by applying a probe to the inner surface layer 10*b* side, and the surface resistivity on the outer peripheral surface side of the intermediate transfer belt 10 was measured by applying a probe to the surface layer 10*c* side.

In the present embodiment, the inner surface layer 10*b* formed on the inner surface of the intermediate transfer belt 10 has a sufficiently lower electrical resistance than the base layer 10*a* and the surface layer 10*c*. Thus, the primary transfer potential supplied by the primary transfer roller 14 offset downstream of the contact position (transfer portion, transfer nip portion) between each photosensitive drum 1 and the intermediate transfer belt 10 is formed on the inner peripheral surface of the intermediate transfer belt 10 as described below. The primary transfer potential is formed on the entire inner surface of the intermediate transfer belt 10 along the inner surface layer 10*b* formed on the inner peripheral surface of the intermediate transfer belt 10. Thus, a potential surface is formed on the inner surface of the intermediate transfer belt 10, and an almost equipotential surface is formed on the inner surface between the stretching member 13 and the primary transfer roller 14*d* in the movement direction of the surface of the intermediate transfer belt 10.

6. Supply of Transfer Promoting Particles

Next, a unit for supplying transfer promoting particles onto the photosensitive drum 1, which is a feature of the present embodiment, is described below. As described above, the transfer promoting particles refer to particles that are interposed between the photosensitive drum 1 and a toner image developed on the photosensitive drum 1 to reduce the adhesion strength between the toner image and the photosensitive drum 1 and thereby improve the primary transfer efficiency of the toner image.

In the present embodiment, before a toner image is developed, toner borne on the development roller 41 is used to supply the transfer promoting particles to the surface of the photosensitive drum 1 in advance. The transfer promoting particles are deposited on the photosensitive drum 1 in advance to interpose the transfer promoting particles between a toner image and the photosensitive drum 1.

Figure 9A:
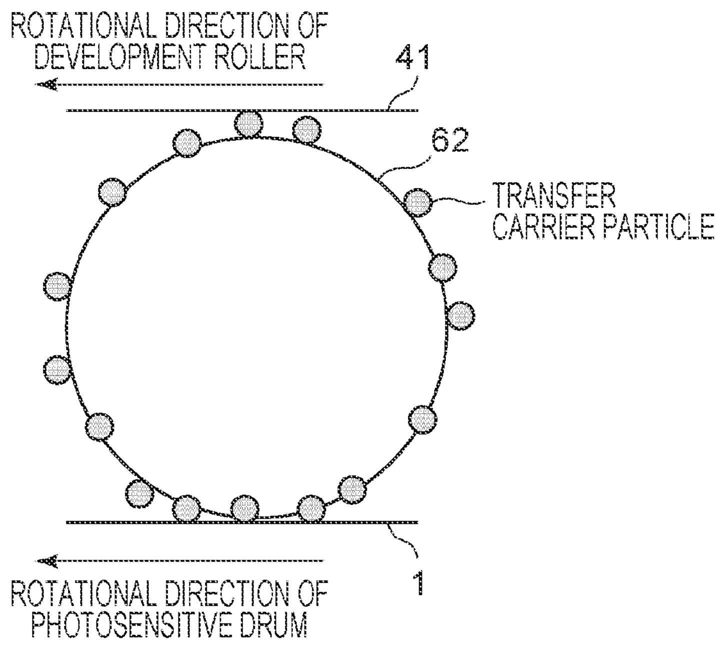
FIGS. 9A and 9B are schematic views of the supply of transfer promoting particles in Embodiment 1.
Figure 9B:
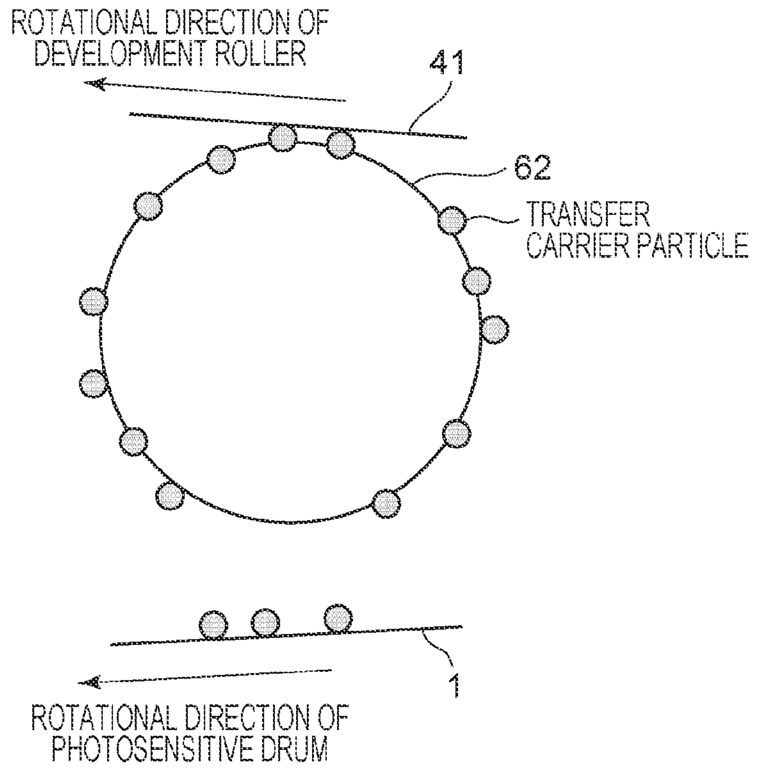

FIG. 9A is a schematic view of a development nip portion while the development roller 41 is in contact with the photosensitive drum 1. As illustrated in FIG. 9A, toner borne on the development roller 41 is in contact with the photosensitive drum 1 via transfer promoting particles in the development nip portion. FIG. 9B is a schematic view of a state after the toner borne on the development roller 41 and the photosensitive drum 1 illustrated in FIG. 9A have passed through the development nip portion. As illustrated in FIG. 9B, the transfer promoting particles interposed between the toner and the photosensitive drum 1 in the development nip portion are transferred and supplied from the surface of the toner borne on the development roller 41 to the surface of the photosensitive drum 1 after passing through the development nip portion.

As illustrated in FIG. 9A, when the adhesion strength Ft between the toner and the transfer promoting particles interposed between the toner and the photosensitive drum 1 in the development nip portion is higher than the adhesion strength Fdr between the transfer promoting particles and the photosensitive drum 1, the transfer promoting particles are difficult to transfer onto the photosensitive drum 1. Ft can therefore be lower than Fdr.

Figure 10A:
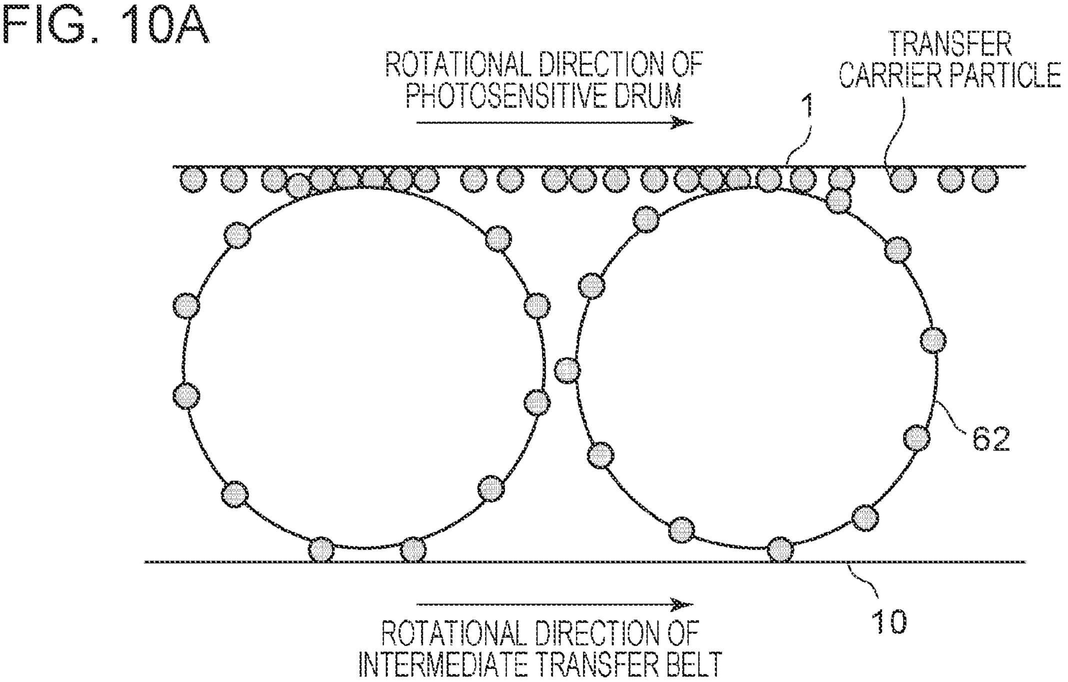
FIGS. 10A and 10B are schematic views of primary transfer in Embodiment 1.
Figure 10B:
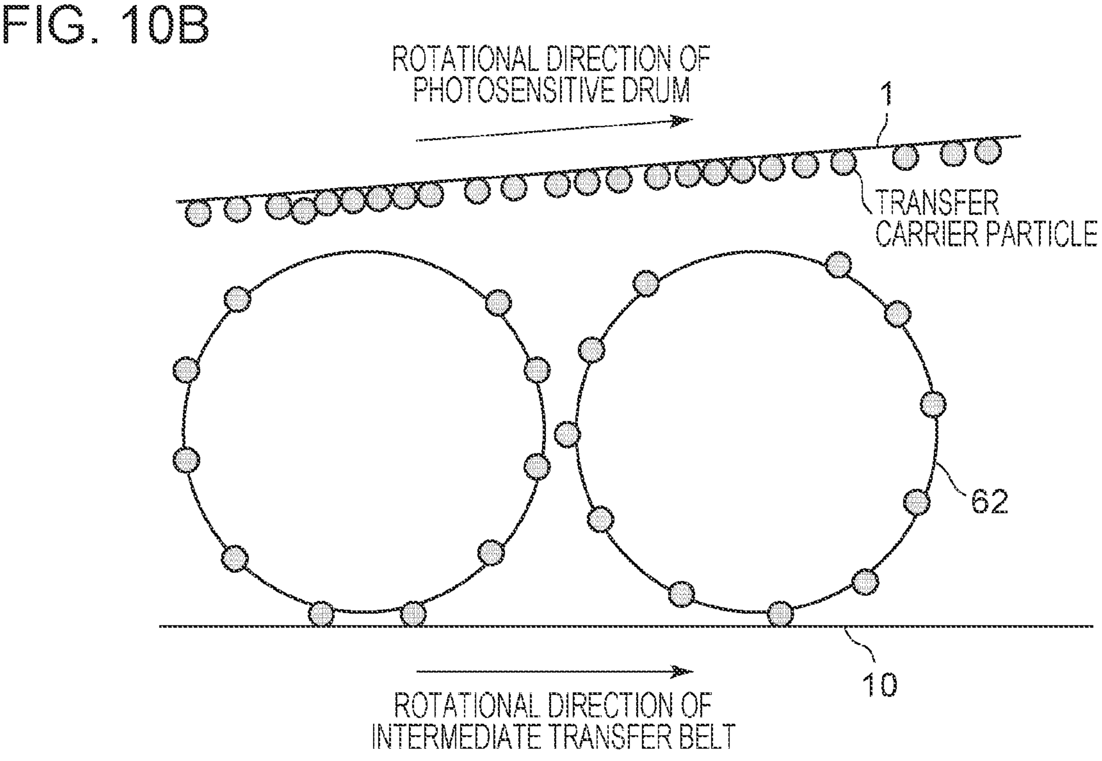

FIG. 10A is a schematic view of the primary transfer portion while a toner image is borne on the surface of the photosensitive drum 1. FIG. 10B is a schematic view of a state where the photosensitive drum 1 is separated from the intermediate transfer belt 10 after the primary transfer of the toner image illustrated in FIG. 10A is completed.

From the perspective that the transfer promoting particles once transferred onto the photosensitive drum 1 are not easily transferred onto the intermediate transfer belt 10, the adhesion strength Fi between the transfer promoting particles and the surface of the intermediate transfer belt 10 and the adhesion strength Fdr1 between the transfer promoting particles and the photosensitive drum 1 can be Fdr1>Fi. The conditions of adhesion strength are described below, wherein F1 denotes the pressing force for pressing the photosensitive drum 1 against the intermediate transfer belt 10, and N1 denotes the total number of transfer promoting particles interposed between the photosensitive drum 1 and the intermediate transfer belt 10 in the transfer portion. Assume that Fi denotes the adhesion strength formed between the transfer promoting particles and the intermediate transfer belt 10 measured when the transfer promoting particles are pressed against the intermediate transfer belt 10 at a pressing force per unit transfer promoting particle F1/N1. Assume that Fdr1 denotes the adhesion strength formed between the transfer promoting particles and the photosensitive drum 1 measured when the transfer promoting particles are pressed against the photosensitive drum 1 at F1/N1.

The present embodiment has the relationship of Fdr1>Fi, and the transfer promoting particles transferred onto the photosensitive drum 1 in the primary transfer portion tend to remain on the photosensitive drum 1.

Assume that a toner image and transfer promoting particles interposed between the toner image and the photosensitive drum 1 are primary-transferred to the intermediate transfer belt 10 and the transfer promoting particles are lost from the surface of the photosensitive drum 1. This may be the case of Fdr1<Fi, for example. In such a case, transfer promoting particles are not interposed between the photosensitive drum 1 and a toner image to be developed next on the surface of the photosensitive drum 1. This may increase the adhesion strength between the toner image and the photosensitive drum 1 and reduce primary transferability. If the relationship of Ft<Fdr is satisfied, however, even when transfer promoting particles are lost by primary transfer from the surface of the photosensitive drum 1, the transfer promoting particles can be immediately supplied from the development roller 41 to the surface of the photosensitive drum 1. Thus, Ft can be lower than Fdr not only to make it easier to supply transfer promoting particles from toner borne on the development roller 41 to the photosensitive drum 1 but also to hold the transfer promoting particles on the photosensitive drum 1.

Thus, due to the adhesion strength relationship of Ft<Fdr, transfer promoting particles deposited on the surface of the photosensitive drum 1 reduce the adhesion strength of toner to the photosensitive drum 1 and improve transfer efficiency.

<Supply of Transfer Promoting Particles from Development Roller 41>

In the present embodiment, the development roller 41 and the photosensitive drum 1 have a peripheral speed difference. More specifically, as described above, the development roller 41 is driven at a peripheral speed of 140% of the peripheral speed of the photosensitive drum 1. A peripheral speed difference between the development roller 41 and the photosensitive drum 1 causes toner to rotate in the development nip portion. Rotation of toner in the development nip portion increases the chance of transfer promoting particles on the toner particles not in contact with the photosensitive drum 1 in the upstream of the development nip portion coming into contact with the photosensitive drum 1 and enables the transfer promoting particles to be transferred from the toner to the photosensitive drum 1. This can increase the chance of supplying the transfer promoting particles from the toner to the photosensitive drum 1, and the transfer promoting particles can be sufficiently deposited on the surface of the photosensitive drum 1.

In the present embodiment, the surface potential of the photosensitive drum 1 is set to a non-image-forming potential Vd of −500 V at which toner charged with normal polarity is not developed at the timing of supplying transfer promoting particles. Thus, at the timing of supplying transfer promoting particles in the present embodiment, toner with negative normal polarity is not developed from the development roller 41 to the surface of the photosensitive drum 1, and only the transfer promoting particles are supplied from the development roller 41 to the photosensitive drum 1.

The following problems occur when transfer promoting particles are supplied from toner on the development roller 41 to the photosensitive drum 1 in the presence of a potential difference between the development roller 41 and the photosensitive drum 1 as in the present embodiment. Transfer promoting particles with a too large particle diameter are easily affected by electrostatic force generated by a potential difference between the development roller 41 and the photosensitive drum 1. This makes it difficult to control the supply of the transfer promoting particles from toner on the development roller 41 to the photosensitive drum 1. For example, when transfer promoting particles are supplied at a non-image-forming potential as in the present embodiment, transfer promoting particles negatively charged are attracted to the development roller 41 by electrostatic force. This makes it difficult to supply transfer promoting particles from toner on the development roller 41 to the photosensitive drum 1. Transfer promoting particles preferably have a particle diameter of 1000 nm or less to reduce the influence of electrostatic force. In the present embodiment, to stably supply transfer promoting particles from toner on the development roller 41 to the surface of the photosensitive drum 1 regardless of the potential difference between the development roller 41 and the photosensitive drum 1, the transfer promoting particles have a particle diameter of 100 nm.

7. Effects of Transfer Promoting Particles

An effect confirmatory experiment to confirm the effects of the unit for supplying transfer promoting particles to the photosensitive drum 1 of the present embodiment is described below. To verify the effects of transfer promoting particles, measurement was performed on the amount of untransferred toner when the transfer promoting particles were supplied, the coverage of the photosensitive drum 1 with the transfer promoting particles, and the adhesion strength of toner and the photosensitive drum 1 to the transfer promoting particles. Each measurement method is described below.

i) Measurement of Amount of Untransferred Toner

First, a yellow patch image with a density of 100% is formed with the image-forming apparatus 100 including a new photosensitive drum 1 without transfer promoting particles Immediately after completion of the primary transfer of the yellow patch image, the image-forming apparatus 100 is deactivated. The untransferred toner density was examined in a patch image portion remaining on the surface of the photosensitive drum 1*a* in a yellow station for the primary transfer bias.

The untransferred toner density was measured by the following method. First, a transparent tape (polyester tape 5511, Nichiban Co., Ltd.) was attached to an untransferred toner portion of the yellow patch image on the surface of the photosensitive drum 1*a* to collect untransferred toner by the transparent tape. The transparent tape by which the untransferred toner was collected from the surface of the photosensitive drum 1*a* and a new transparent tape were attached to high white paper (GFC081 CANON KABUSHIKI KAISHA). The density D1 of the transparent tape in the untransferred toner collecting portion and the density D0 of the new transparent tape portion were measured with a reflection densitometer (reflectometer model TC-6DS manufactured by Tokyo Denshoku Co., Ltd.). The difference "D1−D0" calculated from the measurement was defined as the untransferred toner density. A lower untransferred toner density indicates a smaller amount of untransferred toner. An untransferred toner density of 1.0 or less can be judged that there is almost no untransferred toner and no adverse effect in an image caused by adhesion of the untransferred toner to the charging roller 2*a*.

ii) Measurement of Coverage with Transfer Promoting Particles

The surface of the photosensitive drum 1*a* on which the untransferred toner density was measured was observed with a microscope to calculate the coverage of the surface of the photosensitive drum 1*a* with transfer promoting particles. More specifically, the coverage was calculated through the following procedure in an image on the surface of the photosensitive drum 1*a* observed with a laser microscope (VK-X200, Keyence Corporation) at a magnification of 3000 times. The transfer promoting particle portion and the other portion were binarized to calculate the total area percentage of the transfer promoting particles on the surface of the photosensitive drum 1 as the coverage of the surface of the photosensitive drum 1 with the transfer promoting particles.

iii) Measurement of Adhesion Strength

The adhesion strength between transfer promoting particles and toner used in the present embodiment was measured with an SPM. More specifically, a cantilever with a tip to which transfer promoting particles were fixed was prepared and was pressed against toner at predetermined pressing force. The force required to separate the cantilever from the toner was measured as the adhesion strength Ft between the transfer promoting particles and the toner.

The pressing force for pressing the cantilever against the toner to measure the adhesion strength can be the force for pressing the transfer promoting particles interposed between the toner and the photosensitive drum 1 against the toner in the development nip portion. The pressing force was calculated by a calculation method described below. The phrase "transfer promoting particles are interposed between toner and the photosensitive drum 1 in the development nip portion" means that the transfer promoting particles are simultaneously in contact with both the toner and the photosensitive drum 1.

Figure 11A:
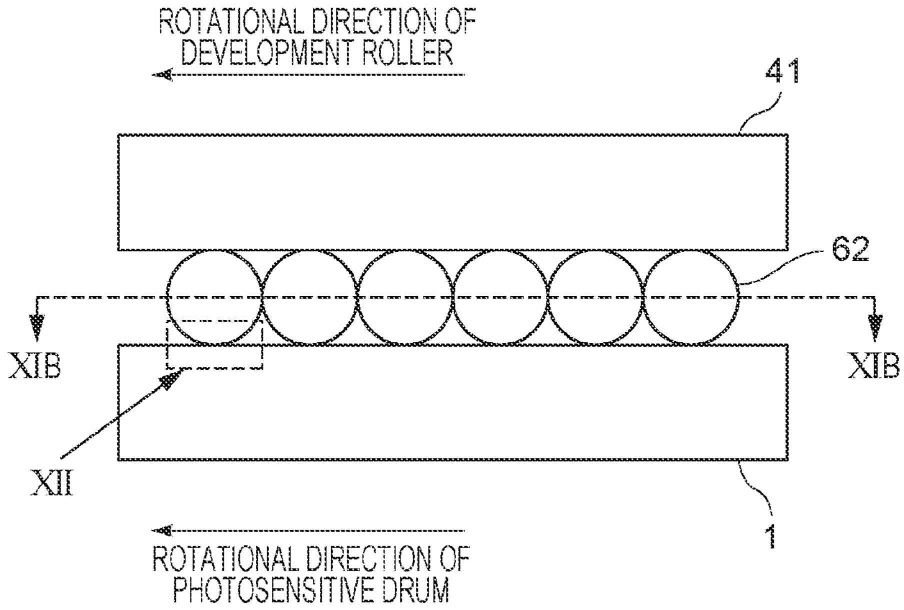
FIGS. 11A and 11B are views of the contact state of toner in a developing portion in Embodiment 1.
Figure 11B:
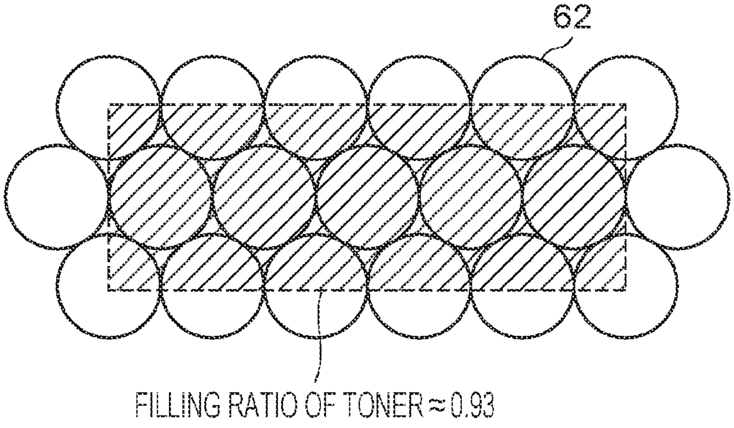
Figure 12:
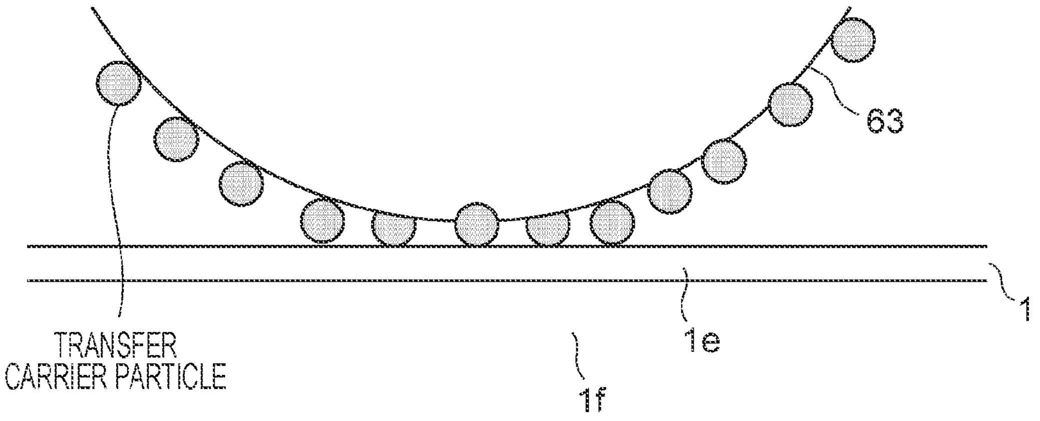
FIG. 12 is a view of the state of presence of toner and transfer promoting particles in the developing portion in Embodiment 1.

First, assumed conditions for the calculation are described below with reference to FIGS. 11 and 12. FIG. 11A is a schematic view of a development nip portion on the assumption that the development roller 41 is in contact with the photosensitive drum 1 via toner in the development nip portion. FIG. 11B illustrates a cross section parallel to the surface of the photosensitive drum 1 taken along the dotted line XIB-XIB of FIG. 11A. It is assumed that the toner in contact with the photosensitive drum 1 is closely packed as indicated by the hatched area. FIG. 12 is an enlarged schematic view of a contact portion between the toner and the photosensitive drum 1, which is surrounded by the dotted line in FIG. 11A. As illustrated in FIG. 12, it is assumed that the toner is in contact with the photosensitive drum 1 via transfer promoting particles. The surface of the photosensitive drum 1 was not yet supplied with the transfer promoting particles, and no transfer promoting particles were present on the surface of the photosensitive drum 1 in advance.

On the basis of the above assumption, the total number N of transfer promoting particles interposed between the toner and the photosensitive drum 1 in the development nip portion was calculated as described below. Pressing force F/N against the toner per transfer promoting particle in the developing portion was calculated from the calculated N and the contact force F between the development roller 41 and the photosensitive drum 1. The calculated F/N was employed as the predetermined pressing force of the cantilever against the toner at the time of measuring the adhesion strength.

First, a method for calculating the total number N of transfer promoting particles interposed between the toner and the photosensitive drum 1 in the development nip portion is described below.

Figure 13A:
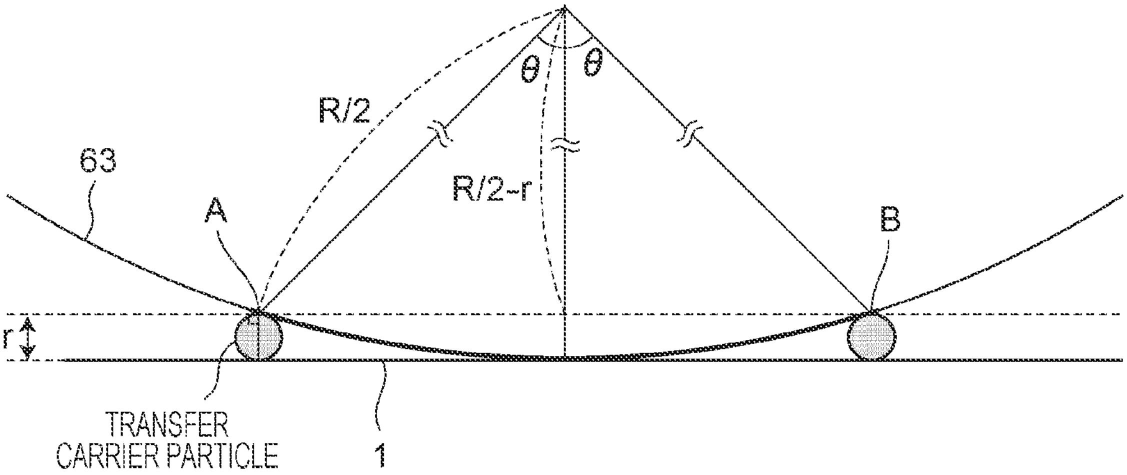
FIGS. 13A and 13B are views of the state of transfer promoting particles in the developing portion in Embodiment 1.
Figure 13B:
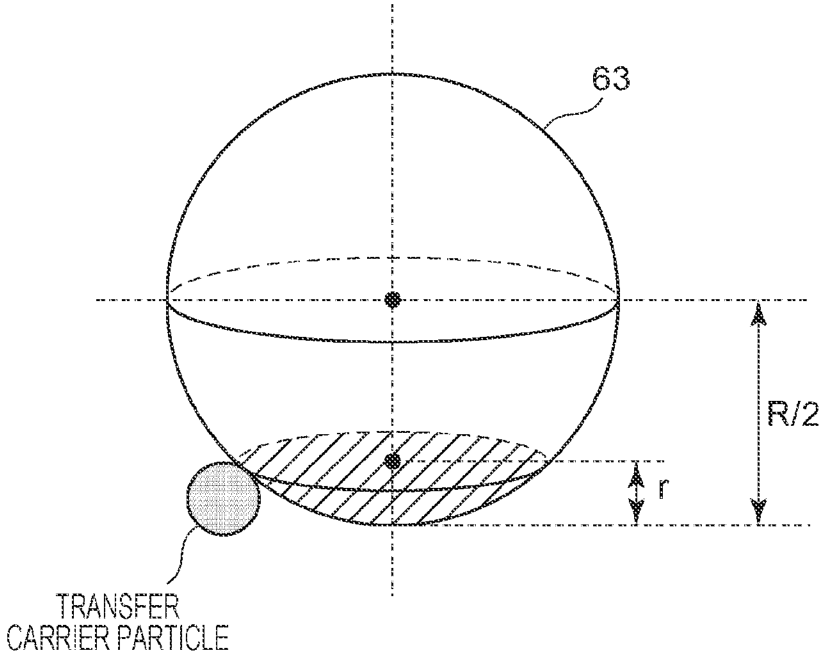

FIG. 13A is a schematic two-dimensional view of the contact between toner, transfer promoting particles, and the photosensitive drum 1 in the developing portion. As illustrated in FIG. 13B, the transfer promoting particles on the toner almost lose contact with the photosensitive drum 1 when the distance between the photosensitive drum 1 and the toner surface exceeds the particle diameter r of the transfer promoting particles. Thus, a portion on the periphery of the toner on which a transfer promoting particle can come into contact with the photosensitive drum 1 is an arc between A and B. As illustrated in FIG. 13B, the toner should actually be considered as a sphere, and it is necessary to determine the ratio of the surface area calculated by integrating the arc AB in the circumferential direction (the hatched area in FIG. 13B) to the surface area of the toner. The surface area of the hatched area can be typically determined as the surface area of the spherical crown, as shown in the formula (2). Thus, the ratio to the toner surface area is expressed by the formula (3). The actual value can be calculated from the average particle diameter R of toner and the particle diameter r of a transfer promoting particle.

$$\text{Toner surface area in which transfer carrier particles can be in contact with photosensitive drum } 1 = 2\pi(R/2)r \quad (2)$$

$$\text{Ratio to the surface area of toner} = 2\pi(R/2)r/4\pi(R/2)^2 \quad (3)$$

Average particle diameter R of toner=7.0 μm=7000 nm

Particle diameter r of transfer carrier particle=100 nm

The ratio of the arc AB to the periphery of the toner in the structure of the present embodiment is calculated to be approximately 1.43%.

Thus, it can be considered that the transfer promoting particles are present between the toner and the photosensitive drum 1 in approximately 1.43% of the entire surface of the toner in the development nip portion. The number of transfer promoting particles on one toner particle is 500, and the number M of transfer promoting particles interposed between the toner and the photosensitive drum 1 on one toner particle is calculated by "500×1.43%" and is approximately 7.2.

The number of transfer promoting particles interposed between the toner and the photosensitive drum 1 per toner particle, 7.2, is multiplied by the total number of toner particles in contact with the photosensitive drum 1 in the developing portion. The total number N of transfer promoting particles interposed between the toner and the photosensitive drum 1 in the development nip portion can be calculated.

The total number L of toner particles in contact with the photosensitive drum 1 in the development nip portion can be calculated by "(the area of the development nip portion x the filling ratio of the toner)/the maximum cross-sectional area of the toner".

The total number of toner particles in contact with the photosensitive drum 1 in the development nip portion $$= \left(220[\text{mm}] \times 2.0[\text{mm}] \times \pi / \sqrt{12}\right) / \left(\pi \times (7.0/2)^2\right)$$

$$= \text{approximately } 10.37 \times 10^6$$

(The closest packing ratio of a two-dimensional circle $\pi/\sqrt{12} \approx 0.9069$ was used.)

Thus, "the total number N of transfer promoting particles interposed between the toner and the photosensitive drum 1 in the development nip portion" is calculated as described below. The total number N is calculated by multiplying "the total number of toner particles in contact with the photosensitive drum 1 in the development nip portion" by "the number of the transfer promoting particles interposed between the toner and the photosensitive drum 1 per toner particle" and is approximately $7.47 \times 10^7$.

The pressing force F of the development roller 41 against the photosensitive drum 1 in the present embodiment is 1.96 N, and "the pressing force against toner per transfer promoting particle in the developing portion" F/N is 26.3 nN. The calculated F/N was employed as a predetermined pressing force of the cantilever against the toner at the time of measuring the adhesion strength with the SPM. The adhesion strength on the photosensitive drum 1 was also measured in the same manner, and the adhesion strength Fdr between the transfer promoting particles fixed to the tip of the cantilever and the photosensitive drum 1 was measured.

<Results of Examining Effects>

Next, described below are the measurement results of the amount of untransferred toner, the coverage of a photosensitive drum with transfer promoting particles, and the adhesion strength of toner and the photosensitive drum 1 to the transfer promoting particles after the transfer promoting particles are supplied. The toner of the present embodiment and toner of Comparative Example 1 described later were examined. The toner of Comparative Example 1 was a developer in which the adhesion strength between transfer promoting particles and the photosensitive drum 1 was not larger than the adhesion strength between the transfer promoting particles and the toner. More specifically, unlike the present embodiment, the toner surface was not covered with an organic silica polymer or the like, and transfer promoting particles were directly externally added to the toner surface in the developer.

i) Measurement Results of Primary-Transfer Remaining Toner

Figure 14:
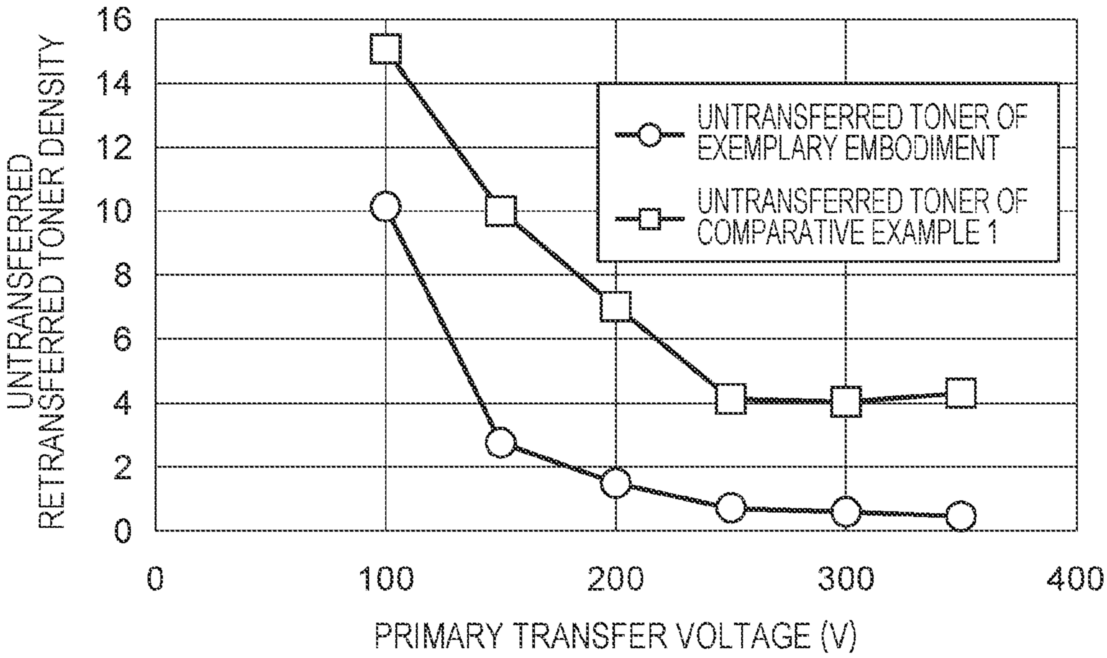
FIG. 14 is a graph showing the results of examining effects on transfer efficiency in Embodiment 1.

FIG. 14 shows the results of an experiment of examining primary-transfer remaining toner. In both the present embodiment and Comparative Example 1, transfer efficiency tends to increase with the primary transfer voltage. In the present embodiment, when the primary transfer voltage is 250 V, the untransferred toner density is 0.7%, and almost no untransferred toner remains, thus indicating high transferability. By contrast, in the developer of Comparative Example 1, the untransferred toner density was 4.1% at a primary transfer voltage of 250 V. An increased amount of untransferred toner causes an adverse effect in an image due to charging failure or the like caused by contamination of the charging roller 2. In the developer of Comparative Example 1, even application of a higher primary transfer voltage resulted in a limited improvement in primary transfer efficiency.

ii) Measurement Results of Coverage

FIG. 15 shows the results of measuring the coverage of the surface of the photosensitive drum 1 with transfer promoting particles. The coverage of the surface of the photosensitive drum 1 with transfer promoting particles in the present embodiment was 61.7%, which indicated that the transfer promoting particles were sufficiently deposited on the photosensitive drum 1. By contrast, in Comparative Example 1, the coverage with transfer promoting particles was 5.0%.

iii) Measurement Results of Adhesion Strength

FIG. 16 shows the results of measuring the adhesion strength between transfer promoting particles and toner and the adhesion strength between the transfer promoting particles and the surface of the photosensitive drum 1. FIG. 16 shows that in the present embodiment the adhesion strength between transfer promoting particles and toner was 32.8 (nN), and the adhesion strength between the transfer promoting particles and the photosensitive drum 1 was 210.1 (nN). This shows that in the present embodiment the adhesion strength between transfer promoting particles and toner was lower than the adhesion strength between the transfer promoting particles and the photosensitive drum 1.

On the other hand, in Comparative Example 1, the adhesion strength between transfer promoting particles and toner was 304.6 (nN), and the adhesion strength between the transfer promoting particles and the photosensitive drum 1 was 210.1 (nN). This shows that in Comparative Example 1 the adhesion strength between transfer promoting particles and toner was higher than the adhesion strength between the transfer promoting particles and the photosensitive drum 1.

8. Effects of Inner Surface Layer

Next, a reduction in the amount of retransferred toner by the intermediate transfer belt 10, which is another feature of the present embodiment, is described below. In the present embodiment, the inner surface layer 10*b* is formed on the intermediate transfer belt 10 to reduce the amount of retransferred toner.

Figure 17:
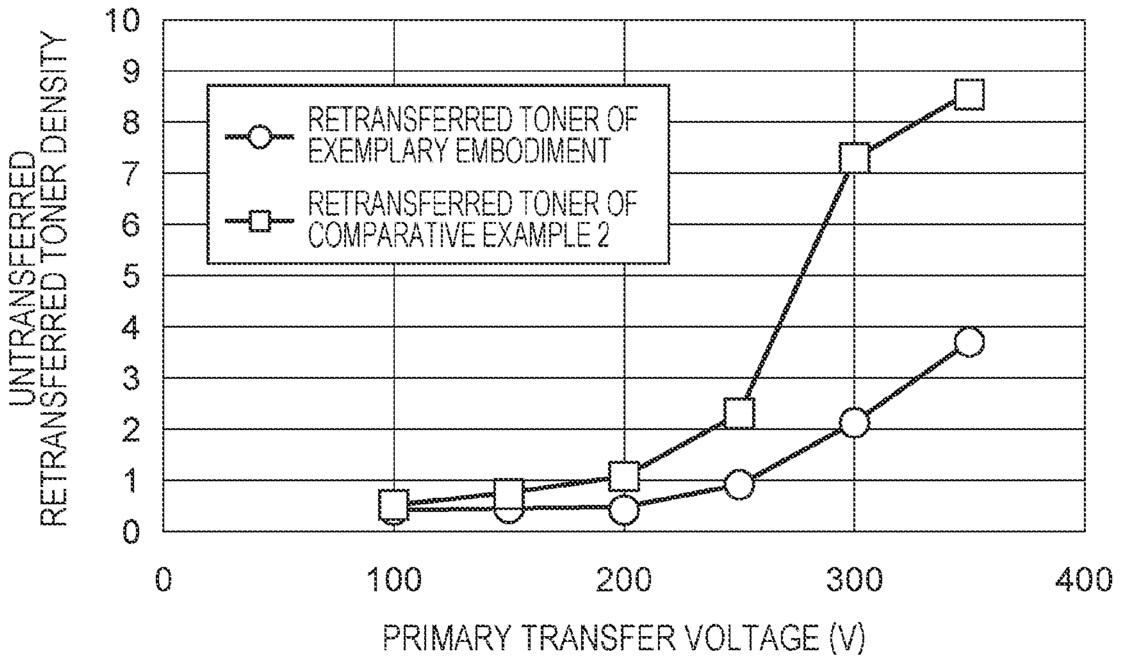
FIG. 17 is a graph showing the results of examining effects on retransfer in Embodiment 1.

The effect of reducing the occurrence of retransfer in the primary transfer portion is described below. The relationship between the primary transfer voltage applied to the intermediate transfer belt 10 and retransfer was compared and verified in the intermediate transfer belt 10 of the present embodiment and an intermediate transfer belt without the inner surface layer 10*b* of Comparative Example 2. FIG. 17 shows the relationship between the applied voltage of a primary transfer power supply and the amount of retransferred toner.

The measurement of retransferred toner is described below. The image-forming apparatus 100 is used to form a yellow patch image with a density of 100%. The image-forming apparatus 100 is deactivated immediately after the yellow patch image primarily transferred onto the intermediate transfer belt 10 has passed through a magenta image-forming station b. At this time, the density of reverse-transferred yellow retransferred toner was observed on the surface of the photosensitive drum 1*b* of the magenta image-forming station b in which an image was not formed at the primary transfer voltage. The vertical axis of FIG. 17 is a parameter indicating the amount of retransferred toner that has moved from the intermediate transfer belt 10 to the photosensitive drum 1 by retransfer.

Retransferred toner remaining on the photosensitive drum 1 was collected by a transparent tape (polyester tape 5511 Nichiban Co., Ltd.) adhered to the surface of the photosensitive drum 1. The transparent tape by which the retransferred toner was collected from the surface of the photosensitive drum 1 and a new transparent tape were attached to high white paper (GFC081 CANON KABUSHIKI KAISHA). The density D1 of the transparent tape in the toner collecting portion and the density D0 of the new transparent tape portion were measured with a reflection densitometer (reflectometer model TC-6DS manufactured by Tokyo Denshoku Co., Ltd.). The difference "D1−D0" calculated from the measurement was defined as the density of toner retransferred onto the photosensitive drum 1.

FIG. 17 shows that, in the intermediate transfer belt without the inner surface layer 10*b* of Comparative Example 2, the amount of retransferred toner increases with the applied voltage. Even at the same applied voltage, the amount of retransferred toner tends to be smaller in the intermediate transfer belt 10 of the present embodiment than in the intermediate transfer belt of Comparative Example 2.

The reason for that is described below. It is thought that the retransfer is caused by a decrease in the electric charge of toner or by reversal of polarity due to a discharge phenomenon generated in the primary transfer portion (transfer nip portion) in which the intermediate transfer belt 10 in the primary transfer portion comes into contact with the photosensitive drum 1.

Paschen's law is generally known with respect to electrical discharge. The distance (gap length) between the surface of the photosensitive drum 1 and the intermediate transfer belt 10 is denoted by d, and the potential difference between the photosensitive drum 1 and the intermediate transfer belt 10 is denoted by V. Electrical discharge occurs when V is higher than the Paschen threshold voltage V(d) and does not occur when V is lower than the Paschen threshold voltage V(d).

To reduce the occurrence of retransfer, therefore, the potential difference V in the primary transfer portion is lower than the threshold voltage V(d) to reduce the occurrence of electrical discharge and suppress a decrease in the electric charge of toner and the reversal of the polarity of the toner.

As described above, the inner surface layer 10*b* with low electrical resistance is formed on the intermediate transfer belt 10 of the present embodiment, and the back surface potential of the intermediate transfer belt 10 is therefore formed in the circumferential direction of the intermediate transfer belt 10. In particular, the inner surface between the stretching member 13 and the primary transfer roller 14*d* in the movement direction of the surface of the intermediate transfer belt 10 is almost equipotential. Thus, electrical discharge also occurs upstream of the primary transfer portion. Toner primarily transferred to the intermediate transfer belt 10 in an upstream image-forming station is exposed to electrical discharge upstream of the primary transfer portion in the next image-forming station. The surface of the photosensitive drum 1 is negatively (negative polarity) charged, and a positive (positive polarity) potential is formed on the surface of the intermediate transfer belt 10. Thus, negatively charged electrons from the photosensitive drum 1 collide with toner on the intermediate transfer belt 10, and the toner on the intermediate transfer belt 10 is more negatively charged. When the charge amount per weight of toner (the amount of electrical charge on a toner particle/the weight of the toner particle) is examined before and after the toner transferred onto the intermediate transfer belt 10 passes through the primary transfer portion in a downstream image-forming portion, the negative charge increases after the toner passes through the photosensitive drum 1.

On the other hand, electrical discharge decreases the potential on the surface of the photosensitive drum 1 (due to charging to the positive polarity side) and therefore decreases the potential difference between the surface of the photosensitive drum 1 and the intermediate transfer belt 10. Thus, the potential difference between the intermediate transfer belt 10 and the photosensitive drum 1 decreases greatly from the time of exposure to electrical discharge to the time of reaching the primary transfer portion in the rotational direction of the photosensitive drum 1. This decreases the potential difference in the primary transfer portion below the Paschen discharge threshold. Thus, electrical discharge rarely occurs in the primary transfer portion.

The intermediate transfer belt of Comparative Example 2 does not have the inner surface layer 10*b* with low electrical resistance, and the inner surface between the stretching member 13 and the primary transfer roller 14*d* in the movement direction of the surface of the intermediate transfer belt 10 therefore does not become almost equipotential. In the intermediate transfer belt of Comparative Example 2, therefore, electrical discharge occurs upstream of the primary transfer portion but does not occur to such an extent that the potential difference between the intermediate transfer belt and the surface of the photosensitive drum becomes equal to or lower than the electrical discharge threshold. Although the potential of the photosensitive drum decreases upon electrical discharge, the potential decrease of the intermediate transfer belt of Comparative Example 2 is small due to less electrical discharge in the upstream of the primary transfer portion. Thus, electrical discharge continues also in the primary transfer portion.

A method for actually checking for electrical discharge between the intermediate transfer belt 10 and the photosensitive drum 1 is described below with reference to FIGS. 18 and 19.

Figure 18:
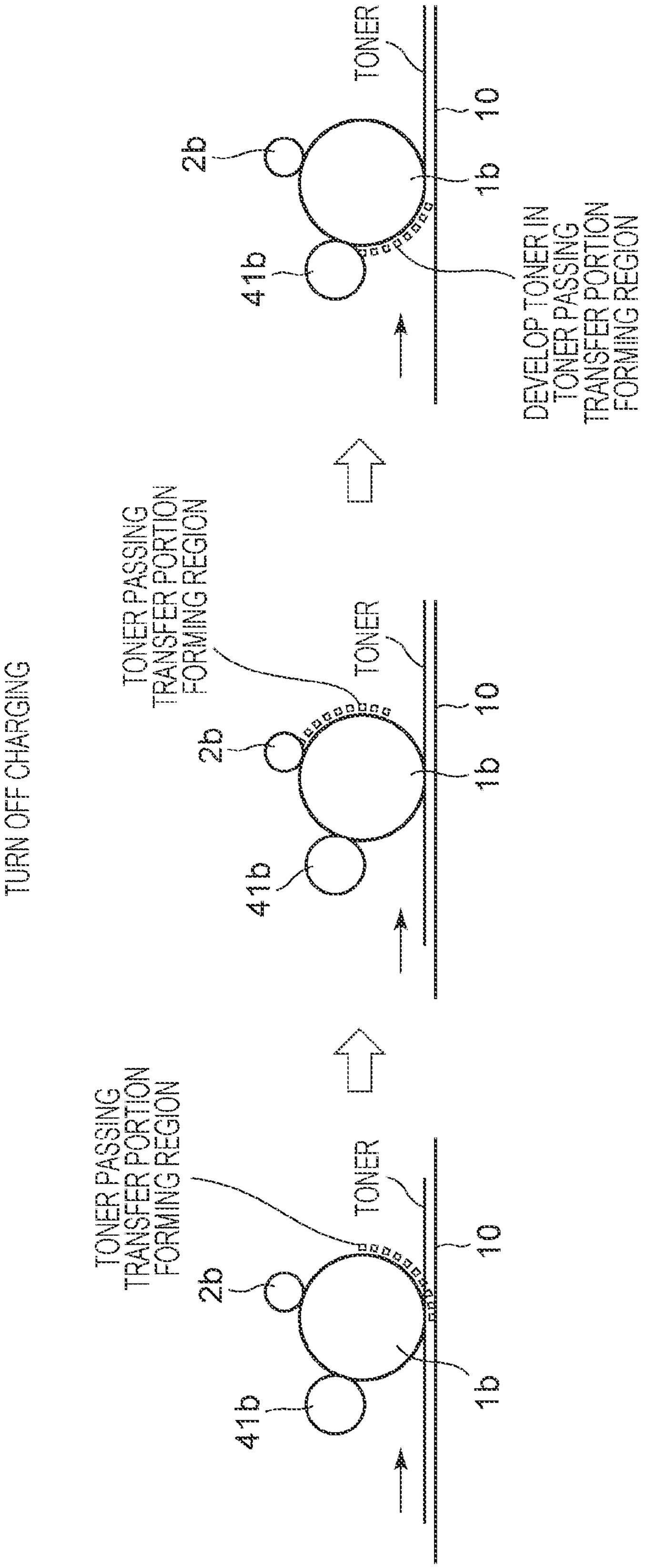
FIG. 18 is a flow chart of electrical discharge in a transfer nip examined in Embodiment 1.

FIG. 18 is a system for visualizing whether electrical discharge actually occurs between the intermediate transfer belt 10 and the photosensitive drum 1. FIG. 18 is a cross-sectional view of a structure around the photosensitive drum 1 cut in a cross section perpendicular to the rotation axial direction of the photosensitive drum 1. In FIGS. 18 and 19, the conditions for the structure of the present embodiment are also applied to the items for which the examination conditions are not described. First, a yellow toner is transferred to the intermediate transfer belt 10. The yellow toner is then passed between the intermediate transfer belt 10 and a magenta photosensitive drum 1*b* located downstream of a yellow image-forming portion a in the movement direction of the intermediate transfer belt 10. When the yellow toner passes through the transfer portion, the charging voltage is turned off before the region of the photosensitive drum 1*b* forming the transfer portion reaches the charging portion, which is a contact portion with the charging roller 2*b*. If retransferred toner is retransferred to the photosensitive drum 1, the retransferred toner can be removed with a cleaning device or the like before that. When the charging voltage is turned off, the region of the photosensitive drum 1*b* through which the yellow toner has passed maintains the surface potential of the primary transfer (post-transfer potential). While this state is maintained, a development voltage of −500 V is applied to develop a magenta toner using a development roller 41*b* in the region of the photosensitive drum 1*b* through which the yellow toner has passed. The magenta toner developed on the surface of the photosensitive drum 1*b* is then observed. Alternatively, the magenta toner transferred onto the surface of the intermediate transfer belt 10 is observed again. When electrical discharge occurs in the transfer nip portion, a spotted toner image is developed. On the other hand, when electrical discharge occurs upstream of the transfer nip portion and does not occur in the transfer nip, toner corresponding to the potential difference between the development voltage and the post-transfer potential is developed but does not form spots. In examination in the system illustrated in FIG. 18 including the intermediate transfer belt 10 of Comparative Example 2, a spotted toner image was observed. By contrast, in the same examination using the intermediate transfer belt 10 of the present embodiment, no spotted toner image was observed.

Figure 19:
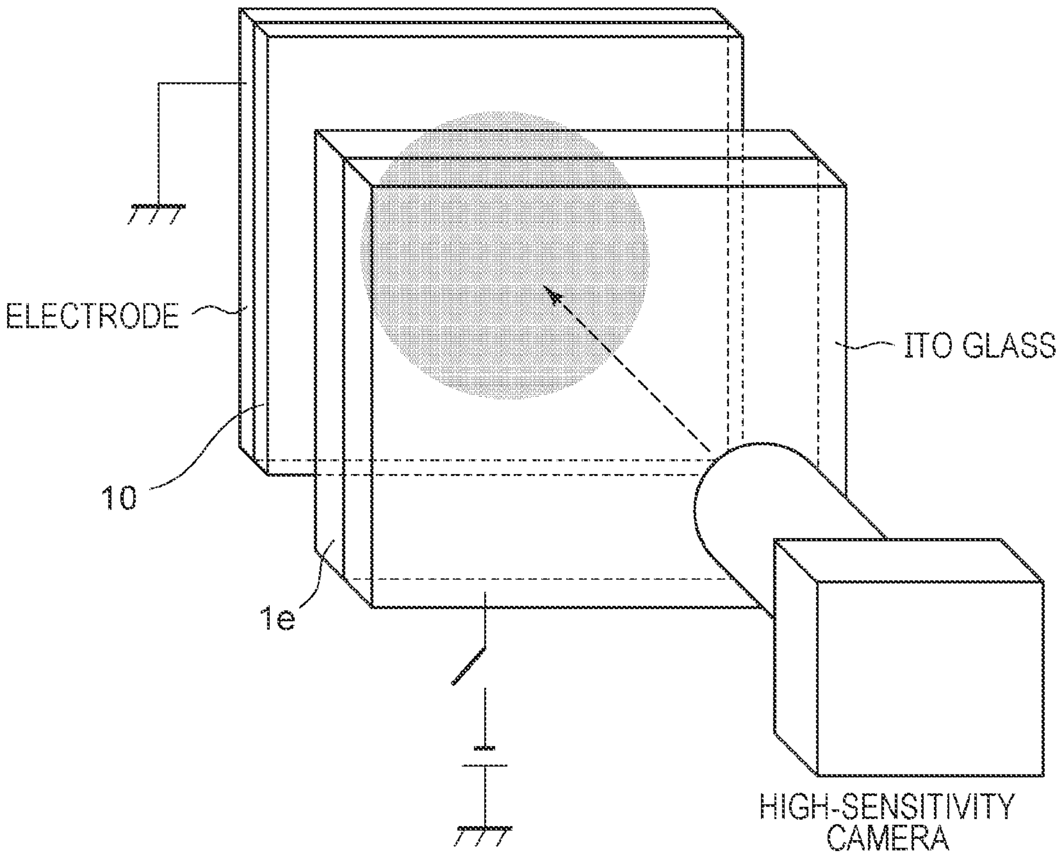
FIG. 19 is a schematic view of a discharge light observation method in Embodiment 1.

Next, actual discharge light observation was performed as illustrated in FIG. 19. FIG. 19 illustrates a system for observing a model that simulates the transfer nip portion, which is the contact portion between the intermediate transfer belt 10 and the photosensitive drum 1, from outside with a high-sensitivity camera (FASTCAM MAX I.I. manufactured by Photron Limited). The intermediate transfer belt 10 is, for example, a piece cut from the intermediate transfer belt 10 of Comparative Example 2, and the back side of the intermediate transfer belt 10 is connected to an electrode and is grounded. On the other hand, for the photosensitive drum 1, the surface layer 1*e* of the photosensitive drum 1 of the present embodiment is applied to a transparent conductive indium tin oxide (ITO) glass substrate, and a voltage is applied to the ITO. Toner is transferred onto the surface of one piece of the intermediate transfer belt 10, and the surface layer 1*e* and one piece of the intermediate transfer belt 10 form a transfer portion and sandwich the toner therebetween. A void between the surface layer 1*e* and one piece of the intermediate transfer belt 10 ranged from 6 to 15 μm. Discharge light generated by the application of a pulse voltage in this state was examined with the high-sensitivity camera. A toner layer was formed between one piece of the intermediate transfer belt 10 and the surface layer 1*e*. When varying pulse voltages were applied, no spotted discharge light was observed at a voltage lower than the electrical discharge threshold, and spotted discharge light was observed at a pulse voltage equal to or higher than the electrical discharge threshold. Thus, it was found that spotted electrical discharge occurs when electrical discharge occurs in the transfer nip. This result shows that the spotted toner image formed in the system illustrated in FIG. 18 including the intermediate transfer belt 10 of Comparative Example 2 resulted from electrical discharge in the transfer nip. The spotted electrical discharge does not usually occur when electrical discharge occurs continuously. Spotted electrical discharge often occurs when electrical discharge occurs intermittently from a portion in which the electrical discharge threshold is locally exceeded in the transfer nip portion. Thus, when incomplete electrical discharge (including no electrical discharge) occurs upstream of the transfer nip portion, the surface potential of the photosensitive drum 1 cannot be completely reduced (increased to the polarity side opposite to the normal polarity of the toner) due to the incomplete electrical discharge. Thus, it is thought that, when the surface of the photosensitive drum 1 subjected to intermittent electrical discharge enters the transfer nip portion, the discontinuous spotted electrical discharge occurs.

These results show that, in the structure including the intermediate transfer belt 10 of the present embodiment, sufficient electrical discharge (electrical discharge based on the Paschen's law corresponding to a predetermined gap) occurs upstream of the transfer nip portion. This indicates that electrical discharge can be suppressed in the transfer nip portion. On the other hand, it was confirmed that, in the structure including the intermediate transfer belt 10 of Comparative Example 2, electrical discharge did not significantly occur upstream of the transfer nip portion, and electrical discharge occurred in the transfer nip portion. Thus, the phenomenon shows that the intermediate transfer belt 10 of the present embodiment can effectively suppress the formation of retransferred toner.

Thus, the structure of the present embodiment can reduce retransferred toner in the primary transfer step by passing an electric current from the primary transfer voltage power supply 160 to the photosensitive drum 1 through the intermediate transfer belt 10 on which the inner surface layer 10*b* with low electrical resistance is formed.

To decrease the amount of electrical discharge in the primary transfer portion and to decrease the amount of toner to be retransferred, the charge amount on the photosensitive drum 1 is advantageously decreased. This may be achieved, for example, using the photosensitive drum 1 having a surface layer with a large thickness and low permittivity. This may also be achieved by a low charging potential from the perspective of setting image-forming potential.

As described above, the present embodiment provides an image-forming apparatus with the following structure and characteristics. The image-forming apparatus includes the rotatable photosensitive drum 1, the charging roller 2 for charging the surface of the photosensitive drum 1 in the charging portion facing the photosensitive drum 1, and the rotatable development roller 41 for bearing a developer composed of toner particles and transfer promoting particles attached to the surfaces of the toner particles. The development roller 41 comes into contact with the photosensitive drum 1, forms a developing portion, and supplies the developer to the surface of the photosensitive drum 1 in the developing portion. The image-forming apparatus includes the intermediate transfer belt 10, which comes into contact with the photosensitive drum 1 and forms a transfer portion. The image-forming apparatus includes a charging voltage application unit 120 for applying a charging voltage to the charging roller 2, and the primary transfer voltage power supply 160 as a current supply unit for applying a transfer voltage to the intermediate transfer belt 10 and thereby supplying a transfer current from the intermediate transfer belt 10 to the photosensitive drum 1 in the transfer portion. The image-forming apparatus further includes the control unit 200 for controlling the charging voltage application unit 120 and the primary transfer voltage power supply 160. A developer composed of toner particles and transfer promoting particles attached to the surface of the toner particles is borne on the development roller 41. In the development nip portion, the transfer promoting particles borne on the surface of the development roller 41 are supplied to the surface of the photosensitive drum 1. Assume that F denotes the pressing force for pressing the development roller 41 against the photosensitive drum 1 and N denotes the total number of transfer promoting particles interposed between the toner particles and the photosensitive drum 1. Assume that Ft denotes adhesion strength formed between the transfer promoting particles and the toner particles measured when the transfer promoting particles are pressed against the toner particles at a pressing force per unit transfer promoting particle F/N. Assume that Fdr denotes adhesion strength formed between the transfer promoting particles and the photosensitive drum 1 measured when the transfer promoting particles are pressed against the photosensitive drum 1 at F/N. When the adhesion strength Ft and the adhesion strength Fdr satisfy $Ft<Fdr$, the adhesion strength between the surface of the photosensitive drum and the toner particles can be reduced to improve primary transfer efficiency.

Furthermore, the inner surface layer 10*b* with low electrical resistance is formed on the inner surface of the intermediate transfer belt 10 to generate an electrical discharge from the surface of the intermediate transfer belt 10 to the photosensitive drum 1 upstream of the primary transfer portion. This can reduce the potential difference between the photosensitive drum 1 and the surface of the intermediate transfer belt 10 in the primary transfer portion. This can suppress a decrease in the electric charge of toner on the intermediate transfer belt 10 and reversal of polarity of the toner in the primary transfer portion and suppress retransfer of toner transferred to the surface of the intermediate transfer belt 10. This can decrease the amount of toner remaining on the photosensitive drum 1 and reduce image defects caused by the residual toner.

Furthermore, the control unit 200 performs control to generate an electrical discharge between the photosensitive drum 1 and the intermediate transfer belt 10 upstream of an upstream end portion of the transfer portion in the movement direction of the surface of the intermediate transfer belt 10. Furthermore, the potential difference between the photosensitive drum 1 and the intermediate transfer belt 10 in the transfer portion is controlled to be lower than the Paschen discharge threshold. The potential difference between a first potential formed on the surface of the photosensitive drum 1 and the charging voltage in the charging portion is defined as a first potential difference. The potential difference between a second potential formed on the surface of the photosensitive drum 1 and the surface potential of the intermediate transfer belt 10 in the transfer portion is defined as a second potential difference. Then, the control unit 200 performs control so that the second potential difference is smaller than the first potential difference while the photosensitive drum 1 rotates and the charging voltage is applied. The second potential difference may be a potential difference between the second potential formed on the surface of the photosensitive drum 1 in the transfer portion and the primary transfer voltage when the intermediate transfer belt 10 has sufficiently small electrical resistance.

The image-forming apparatus further includes the primary transfer roller 14 that comes into contact with the intermediate transfer belt 10 and supplies an electric current to the intermediate transfer belt 10. The primary transfer roller 14 is a cylindrical metal roller. The intermediate transfer belt 10 has, in the thickness direction of the intermediate transfer belt 10, the base layer 10*a* as a first layer with electroconductivity among a plurality of layers constituting the intermediate transfer belt 10 and the inner surface layer 10*b* as a second layer with electroconductivity and with a lower electrical resistance than the base layer 10*a*. A voltage is applied from the primary transfer voltage power supply 160 to the primary transfer roller 14 to pass a transfer current in the circumferential direction of the intermediate transfer belt 10 and transfer a toner image from the photosensitive drum 1 to the intermediate transfer belt 10. The base layer 10*a* is the thickest among the plurality of layers constituting the intermediate transfer belt 10. Furthermore, the intermediate transfer belt 10 has the surface layer 10*c* as a third layer with a higher electrical resistance than the base layer 10*a*, and the surface layer 10*c* has electroconductivity and comes into contact with the photosensitive drum 1. The base layer 10*a* may be configured to come into contact with the photosensitive drum 1. The inner surface layer 10*b* is formed at a position farther from the photosensitive drum 1 than the base layer 10*a* in the thickness direction of the intermediate transfer belt and comes into contact with the primary transfer roller 14. An electric current flowing from the primary transfer roller 14 to the photosensitive drum 1 in the circumferential direction of the intermediate transfer belt 10 flows through the inner surface layer 10*b* and then flows through the base layer 10*a* to the photosensitive drum 1. A plurality of photosensitive drums 1 and a plurality of primary transfer rollers 14 are provided in the movement direction of the intermediate transfer belt 10, and the plurality of primary transfer rollers 14 correspond to their respective photosensitive drums 1. The image-forming apparatus further includes the secondary transfer roller 15 for transferring a toner image formed on the surface of the intermediate transfer belt 10 from the surface of the intermediate transfer belt 10 to a recording material. In the movement direction of the surface of the intermediate transfer belt 10, each of the plurality of primary transfer rollers 14 is located downstream of the position where the photosensitive drum 1 corresponding to the primary transfer roller 14 comes into contact with the intermediate transfer belt 10. The primary transfer rollers 14 are located upstream of the position where the secondary transfer roller 15 comes into contact with the intermediate transfer belt 10. The plurality of photosensitive drums 1 and the plurality of primary transfer rollers 14 are arranged such that the distance from the shaft center of each photosensitive drum 1 to the shaft center of the corresponding primary transfer roller 14 is the same.

The movement speed of the surface of the intermediate transfer belt 10 is set to be higher than the movement speed of the surface of the photosensitive drum 1.

Assume that F1 denotes the pressing force for pressing the photosensitive drum 1 against the intermediate transfer belt 10 and N1 denotes the total number of transfer promoting particles interposed between the photosensitive drum 1 and the intermediate transfer belt 10 in the transfer portion. Assume that Fi denotes the adhesion strength formed between the transfer promoting particles and the intermediate transfer belt 10 measured when the transfer promoting particles are pressed against the intermediate transfer belt 10 at a pressing force per unit transfer promoting particle F1/N1. Assume that Fdr1 denotes the adhesion strength formed between the transfer promoting particles and the photosensitive drum 1 measured when the transfer promoting particles are pressed against the photosensitive drum 1 at F1/N1. Fi and Fdr1 can satisfy $Fi<Fdr1$.

Figure 20:
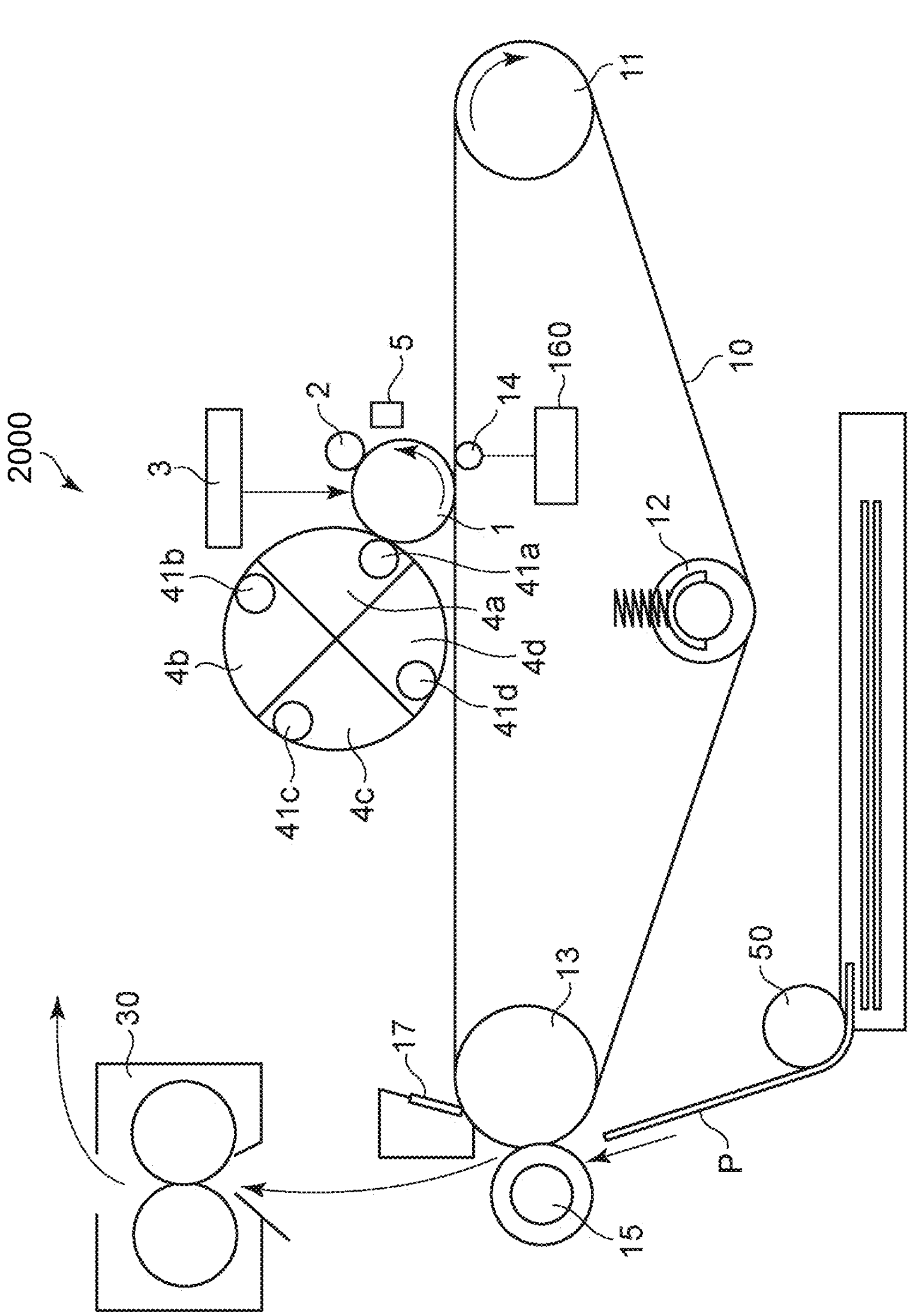
FIG. 20 is a schematic view of an image-forming apparatus according to another embodiment.

In the present embodiment, a tandem-type image-forming apparatus including a plurality of image-forming stations arranged in series is described as an example. However, a rotary type image-forming apparatus 2000 including one image-forming station that forms a toner image of a plurality of colors as illustrated in FIG. 20 also has the same effects.

Although the primary transfer roller 14 is a metal roller in the present embodiment, a primary transfer roller with an elastic layer on a metal core also functions in the same manner Although four metal rollers 14 corresponding to their respective image-forming stations are provided on the inner surface of the intermediate transfer belt 10, the number of the metal rollers 14 may be increased or decreased. For example, only one metal roller 14 may be provided between the second image-forming station b and the third image-forming station c.

Furthermore, although a transfer electric field is formed upstream of the primary transfer portion by forming the inner surface layer 10*b* with low electrical resistance of the intermediate transfer belt 10 in the present embodiment, the inner surface layer 10*b* is not necessarily required if the base layer 10*a* has sufficiently low electrical resistance. For example, the intermediate transfer belt may have a surface layer with high electrical resistance on a base layer with low electrical resistance.

Although a drum-cleaner-less structure is described in the present embodiment as an example of a structure for reducing toner remaining on the photosensitive drum 1, a structure with a cleaner member for cleaning the toner remaining on the photosensitive drum 1 also has the same effects.

Furthermore, although a direct-current voltage is applied from the primary transfer voltage power supply 160 to the primary transfer roller 14 in the present embodiment, a direct-current voltage may be applied from the secondary transfer voltage power supply 150 to the primary transfer roller 14 to eliminate the primary transfer voltage power supply. Furthermore, a voltage-maintaining element that can maintain a predetermined voltage may be provided between the primary transfer voltage power supply 160 and the primary transfer roller 14. The voltage-maintaining element is typically a Zener diode. The Zener diode is an element that maintains a predetermined voltage (hereinafter referred to as a Zener voltage) by an electric current flow, and a Zener voltage is generated on the cathode side when at least a certain level of electric current flows. One end (an anode side) of a Zener diode is grounded, the other end (a cathode side) is coupled to the primary transfer roller 14, and the primary transfer voltage is maintained at the Zener voltage. Any of these structures can be applied to a structure that can have higher transfer efficiency even at a lower primary transfer voltage when the adhesion strength Ft formed between transfer promoting particles and toner particles and the adhesion strength Fdr formed between transfer promoting particles and the surface of the photosensitive drum 1 satisfy $Ft<Fdr$ as in the present embodiment. Furthermore, electrical discharge can be generated between the photosensitive drum 1 and the intermediate transfer belt 10 upstream of the transfer portion in the movement direction of the surface of the intermediate transfer belt 10, thereby reducing the potential difference in the transfer portion below the Paschen discharge threshold and suppressing retransfer in the present embodiment. Thus, the structure of the present embodiment that can have a lower primary transfer voltage than before can be used to provide an image-forming system that can have the above effects using minimum electric power.

As described above, the present disclosure can improve transfer efficiency and reduce retransfer by effectively supplying fine particles to the surface of a photosensitive drum.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-009849, filed Jan. 26, 2022, which is hereby incorporated by reference herein in its entirety.

What is claimed is:

1. An image-forming apparatus comprising:

a rotatable photosensitive drum;

a developer composed of toner particles having protrusion portions formed on surfaces of the toner particles and transfer promoting particles as an external additive adhered to surfaces of the protrusion portions of the toner particles, wherein the protrusion particles are not formed of the transfer promoting particles as the external additive;

a developing unit storing the developer and including a rotatable development roller, wherein the development roller is configured to (i) bear the developer, (ii) come into contact with the photosensitive drum and form a developing portion, and (iii) supply the developer to a surface of the photosensitive drum in the developing portion;

an intermediate transfer belt configured to come into contact with the photosensitive drum and form a transfer portion;

a primary transfer voltage power supply configured to apply a transfer voltage to the intermediate transfer belt to supply a transfer current from the intermediate transfer belt to the photosensitive drum in the transfer portion; and a controller configured to control the primary transfer voltage power supply, to control rotation of the photosensitive drum, to control rotation of the development roller, and to control contact and separation between the photosensitive drum and the development roller, wherein the transfer promoting particles borne on a surface of the development roller can be supplied to the surface of the photosensitive drum in the developing portion while the photosensitive drum rotates, wherein, in a state where the toner particles of the developer are interposed between the development roller and the photosensitive drum, when F denotes pressing force for pressing the development roller against the photosensitive drum, and N denotes a total number of the transfer promoting particles interposed between the toner particles and the photosensitive drum, adhesion strength Ft formed between a transfer promoting particle of the transfer promoting particles and the photosensitive drum measured by pressing the transfer promoting particle against the toner particles at a pressing force per unit transfer promoting particle F/N and adhesion strength Fdr formed between the transfer promoting particle and the photosensitive drum measured by pressing the transfer promoting particle against the photosensitive drum at the pressing force per unit transfer promoting particle F/N, satisfy $Ft<Fdr$, wherein, where a closest distance between adjacent two of the protrusion portions is a protrusion interval G, an average protrusion interval of the protrusion interval G is less than or equal to an average particle diameter of the transfer promoting particles, wherein, to supply some of the transfer promoting particles to the photosensitive drum from the development roller, the controller is configured to perform control to bring the photosensitive drum and the development roller into contact while the photosensitive drum and the development roller both rotate and while a surface potential of the photosensitive drum is at a non-image-forming voltage, and wherein the controller controls the primary transfer voltage power supply to generate an electrical discharge between the photosensitive drum and the intermediate transfer belt in a movement direction of a surface of the intermediate transfer belt upstream of an upstream end portion of the transfer portion and controls a potential difference between the photosensitive drum and the intermediate transfer belt in the transfer portion to be lower than a Paschen discharge threshold.

2. An image-forming apparatus according to claim 1, further comprising a primary transfer roller configured to come into contact with the intermediate transfer belt and supply an electric current to the intermediate transfer belt, wherein the intermediate transfer belt includes, in a thickness direction of the intermediate transfer belt, a first layer with electroconductivity among a plurality of layers constituting the intermediate transfer belt and a second layer with electroconductivity and with a lower electrical resistance than the first layer among the plurality of layers, and a toner image is transferred from the photosensitive drum to the intermediate transfer belt by applying a voltage from the primary transfer voltage power supply to the primary transfer roller.

3. An image-forming apparatus according to claim 2, wherein an electric current is passed in a circumferential direction of the intermediate transfer belt to transfer a toner image from the photosensitive drum to the intermediate transfer belt.

4. An image-forming apparatus according to claim 2, wherein the first layer is thickest among the plurality of layers constituting the intermediate transfer belt.

5. An image-forming apparatus according to claim 2, wherein the first layer comes into contact with the photosensitive drum.

6. An image-forming apparatus according to claim 2, wherein the plurality of layers constituting the intermediate transfer belt includes a third layer with a higher electrical resistance than the first layer, and the third layer comes into contact with the photosensitive drum.

7. An image-forming apparatus according to claim 6, wherein the third layer is electrically conductive.

8. An image-forming apparatus according to claim 2, wherein the second layer is formed at a position farther from the photosensitive drum than the first layer in the thickness direction and comes into contact with the primary transfer roller.

9. An image-forming apparatus according to claim 8, wherein an electric current flowing from the primary transfer roller toward the photosensitive drum in a circumferential direction of the intermediate transfer belt flows through the second layer and then flows through the first layer to the photosensitive drum.

10. An image-forming apparatus according to claim 2, further comprising:

a plurality of photosensitive drums that include the photosensitive drum; and a plurality of primary transfer rollers that include the primary transfer roller, wherein each primary transfer roller of the plurality of primary transfer rollers corresponds to a respective photosensitive drum of the plurality of photosensitive drums.

11. An image-forming apparatus according to claim 10, further comprising a secondary transfer roller configured to transfer a toner image formed on the surface of the intermediate transfer belt from the surface of the intermediate transfer belt to a recording material, wherein each primary transfer roller of the plurality of primary transfer rollers is located downstream of a position where a corresponding photosensitive drum comes into contact with the intermediate transfer belt and upstream of a position where the secondary transfer roller comes into contact with the intermediate transfer belt in the movement direction of the surface of the intermediate transfer belt.

12. An image-forming apparatus according to claim 10, wherein the plurality of photosensitive drums and the plurality of primary transfer rollers have the same distance from a shaft center of each photosensitive drum of the plurality of photosensitive drums to a shaft center of the respective primary transfer roller of the plurality of primary transfer rollers.

13. An image-forming apparatus according to claim 2, wherein the primary transfer roller is a metal roller.

14. An image-forming apparatus according to claim 1, wherein the surface of the intermediate transfer belt has a higher movement speed than the surface of the photosensitive drum.

15. An image-forming apparatus according to claim 1, wherein, when F1 denotes pressing force for pressing the photosensitive drum against the intermediate transfer belt, and N1 denotes a total number of the transfer promoting particles between the photosensitive drum and the intermediate transfer belt in the transfer portion, adhesion strength Fi formed between the transfer promoting particle and the intermediate transfer belt measured by pressing the transfer promoting particle against the intermediate transfer belt at a pressing force per unit transfer promoting particle F1/N1 and adhesion strength Fdr1 formed between the transfer promoting particle and the photosensitive drum measured by pressing the transfer promoting particle against the photosensitive drum at the F1/N1 satisfy $Fi<Fdr1$.

16. An image-forming apparatus according to claim 1, wherein each of the toner particles has a protrusion on its surface, the protrusion being formed of a fine particle containing an organosilicon polymer with a structure represented by the following formula (1), and the transfer promoting particle is present on the protrusion, $$R—Si(O1/2)3 \quad (1)$$

wherein R denotes a hydrocarbon group having 1 to 6 carbon atoms.

17. An image-forming apparatus according to claim 1, wherein the developer not transferred to the intermediate transfer belt and remaining on the photosensitive drum is collected by the development roller.

18. An image-forming apparatus according to claim 1, wherein the developer is a one-component developer.

19. An image-forming apparatus according to claim 1, wherein the non-image-forming voltage is lower than an image-forming voltage.

* * * * *